(12) United States Patent
Ueda et al.

(10) Patent No.: US 11,104,120 B2
(45) Date of Patent: Aug. 31, 2021

(54) THREE-DIMENSIONAL PRINTING SYSTEM, THREE-DIMENSIONAL PRINTING METHOD, MOLDING DEVICE, FIBER-CONTAINING OBJECT, AND PRODUCTION METHOD THEREOF

(71) Applicants: Nihon University, Tokyo (JP); Tokyo University of Science Foundation, Tokyo (JP)

(72) Inventors: Masahito Ueda, Tokyo (JP); Yoshiyasu Hirano, Tokyo (JP); Ryosuke Matsuzaki, Tokyo (JP)

(73) Assignees: Nihon University, Tokyo (JP); Tokyo University of Science Foundation, Tokyo (JP)

( * ) Notice: Subject to any disclaimer, the term of this patent is extended or adjusted under 35 U.S.C. 154(b) by 687 days.

(21) Appl. No.: 15/313,644

(22) PCT Filed: May 27, 2015

(86) PCT No.: PCT/JP2015/065300
§ 371 (c)(1),
(2) Date: Nov. 23, 2016

(87) PCT Pub. No.: WO2015/182675
PCT Pub. Date: Dec. 3, 2015

(65) Prior Publication Data
US 2017/0210074 A1    Jul. 27, 2017

(30) Foreign Application Priority Data
May 27, 2014  (JP) .............................. JP2014-109509

(51) Int. Cl.
*B29C 64/209*    (2017.01)
*B33Y 50/02*    (2015.01)
(Continued)

(52) U.S. Cl.
CPC ............ *B33Y 50/02* (2014.12); *B29C 64/118* (2017.08); *B29C 64/209* (2017.08);
(Continued)

(58) Field of Classification Search
CPC ...... B29C 64/118; B29C 64/209; B29C 70/38
See application file for complete search history.

(56) References Cited

U.S. PATENT DOCUMENTS 5,936,861 A    8/1999 Jang et al.
2014/0061974 A1    3/2014 Tyler

FOREIGN PATENT DOCUMENTS

EP    2781342    9/2014
JP    11207828 A    8/1999
(Continued)

OTHER PUBLICATIONS

European Search Report, dated Feb. 2, 2018, in connection with European Patent Application No. 15799462.5.
(Continued)

*Primary Examiner* — James Sanders
(74) *Attorney, Agent, or Firm* — Meunier Carlin & Curfman LLC

(57) ABSTRACT

A three-dimensional printing system (1) includes: a head (2) to which a first continuous material (FL) including a resin and a second continuous material (FB) including fibers are fed; a platform (3) on which a printing material based on the first and second continuous materials from the head is stacked; a cutting device (10) which is capable of cutting at least fibers; and a controller (5) which controls an operation device including at least one of the head, the platform, and the cutting device.

16 Claims, 17 Drawing Sheets

(51) Int. Cl.
  *B33Y 80/00* (2015.01)
  *B33Y 10/00* (2015.01)
  *B33Y 30/00* (2015.01)
  *B29C 64/118* (2017.01)
  *B29C 64/295* (2017.01)
  *B29C 70/38* (2006.01)
  *B29K 105/08* (2006.01)

(52) U.S. Cl.
  CPC ............ *B29C 64/295* (2017.08); *B33Y 10/00* (2014.12); *B33Y 30/00* (2014.12); *B33Y 80/00* (2014.12); *B29C 70/38* (2013.01); *B29K 2105/08* (2013.01)

(56) References Cited

FOREIGN PATENT DOCUMENTS

| | | | |
|---|---|---|---|
| JP | 2000254975 A | 9/2000 | |
| WO | 2004003823 A1 | 1/2004 | |
| WO | 2011045172 | 4/2011 | |
| WO | 2014072147 A1 | 5/2014 | |

OTHER PUBLICATIONS

Andreas Fischer et al., "New Fiber Matrix Process with 3D Fiber Printer", Digital Product and Process Development Systems IFIP Advances in Information and Communication Technology, vol. 411, 2013, Germany, Springer Berlin Heidelberg, 2013, vol. 411, pp. 167-175.

International Search Report from the Japanese Patent office for application PCT/JP2015/065300 dated Jul. 7, 2015.

Office Action from the Japanese Patent office for application 2016-523543 dated Aug. 30, 2016.

European Search Report, dated Feb. 2, 2018, in connection with Japanese Patent Application PCT/JP2015/065300.

Chinese Office Action, dated Jun. 21, 2018, in connection with Chinese Application No. 201580027790.5.

(a)

(b)

(c)

(d)

(a)

(b)

(a)  (b)

THREE-DIMENSIONAL PRINTING SYSTEM, THREE-DIMENSIONAL PRINTING METHOD, MOLDING DEVICE, FIBER-CONTAINING OBJECT, AND PRODUCTION METHOD THEREOF

CROSS-REFERENCE TO RELATED APPLICATIONS

This application is a national stage application under 35 U.S.C. 371 based on application PCT/JP2015/065300 filed May 27, 2015, which claims the benefit of and priority to Japanese Patent Application No. 2014-109509, filed on May 27, 2014, the disclosures of which are expressly incorporated herein by reference in their entirety.

TECHNICAL FIELD

The present invention relates to a molding device configured to form a structure by disposing a resin and then solidifying the resin, and particularly to a three-dimensional printing system (a three-dimensional (3D) printer), a three-dimensional printing method, a fiber-containing object, and a production method thereof.

Priority is claimed on Japanese Patent Application No. 2014-109509, filed May 27, 2014, the contents of which are incorporated herein by reference.

BACKGROUND

For example, as a device configured to mold a stereoscopically shaped object, a molding device such as a three-dimensional (3D) printer is known (for example, see Patent Document 1). A 3D printer can easily mold a three-dimensionally shaped object without requiring a mold, a jig, or the like which requires a relative high cost, and can also mold a three-dimensionally shaped object which cannot be easily formed using an existing technique. Even among 3D printers, a 3D printer using a fused deposition modeling method in which resins, which are dissolved by heat, are stacked little by little has relatively low manufacturing costs for a device. Thus, such a 3D printer is used for a trial manufacture and the like of parts in manufacturing industries.

On the other hand, a carbon-fiber-reinforced plastic (CFRP) or carbon-fiber-reinforced thermoplastics (CFRTPs), which have a superior specific rigidity or specific strength than a metallic material, are being applied to, for example, a vehicle of which the weight needs to be reduced in order to reduce fuel consumption.

Non-Patent Document 1 discloses a method of forming CFRTPs using a continuous fiber.

RELATED ART DOCUMENTS

Patent Document

[Patent Document 1]
Published Japanese Translation No. 2005-531439 of the PCT International Publication

Non-Patent Document

[Non-Patent Document 1]
Andreas Fischer, Steve Rommel, Thomas Bauernhansl, "New Fiber Matrix Process with 3D Fiber Printer," Digital Product and Process Development Systems IFIP Advances in Information and Communication Technology, Volume 411, 2013, Germany, Springer Berlin Heidelberg, 2013, Volume 411, Pages 167 to 175

SUMMARY OF INVENTION

Technical Problem

A forming cost can be reduced and a complicated shape can also be molded as long as a part made of a fiber-reinforced plastic such as a CFRTP part can be formed using a three-dimensional (3D) printer.

An object of an aspect related to the present invention is to provide a three-dimensional printing system, a three-dimensional printing method, and a molding device which are capable of forming an object to which a function based on fiber is added.

Solution to Problem

According to an aspect of the present invention, a three-dimensional printing system including: a head by which a first continuous material including a resin and a second continuous material including fibers are fed; a platform on which a printing material based on the first and second continuous materials from the head is stacked; a cutting device configured to cut at least the fibers; and a controller configured to control an operation device including at least one of the head, the platform, and the cutting device is provided.

According to another aspect of the present invention, a three-dimensional printing method including: preparing three-dimensional model data; stacking a printing material on the basis of the three-dimensional model data, in which the step of stacking includes: feeding a first continuous material including a resin and a second continuous material including fibers to a head; stacking a printing material based on the first and second continuous materials from the head on a platform; and cutting at least the fibers is provided.

According to another aspect of the present invention, a fiber-containing object including: a stacked structure formed using a three-dimensional printing system, wherein the stacked structure includes a first portion and a second portion which have different blending states of fibers is provided.

According to another aspect of the present invention, a production method of a fiber-containing object including: a step of preparing three-dimensional model data; and a step of forming a stacked product using the three-dimensional printing system on the basis of the three-dimensional model data is provided.

According to another aspect of the present invention, a molding device which includes a support member, and in which a linear resin is continuously disposed on the support member and then is solidified so that a structure is formed includes: a fiber introducing device configured to introduce fibers, which is continuously formed, into the linear resin; and a cutting device configured to cut the fibers.

The molding device may further include: a resin pushing device configured to push the linear resin; and a heating device disposed at a downstream side of the resin pushing device and configured to heat the linear resin, wherein the fiber introducing device may be configured to introduce the fibers between the resin pushing device and the heating device.

In the molding device, the fiber introducing device may be configured to include a fiber feeding device configured to feed the fibers.

A control device configured to control the cutting device such that a fiber portion into which the fibers are introduced and a resin portion which is formed by only the resin may be configured to be provided in the structure.

Advantageous Effects of Invention

According to an aspect related to the present invention, an object to which a function based on fiber is added can be formed.

In an embodiment, a structure is formed by introducing fibers into a resin so that a strength of the structure can be improved. Also, in the embodiment, the fibers are cut using a cutting device so that a portion that does not include fibers can be provided in a linear resin. In other words, the amount of fibers that are included in the structure can be adjusted.

DESCRIPTION OF EMBODIMENTS

Hereinafter, embodiments of the present invention will be described with reference to the drawings.

In one embodiment, a molding device is a device configured to form a structure by continuously arranging a filament serving as a linear (filamentous) thermoplastic resin on a platform serving as a plate-shaped support member. In an example, the molding device is a device (a three-dimensional (3D) printer or a three-dimensional printing system) configured to mainly form a three-dimensional structure by stacking a filament (a printing material) on a platform in a state in which it is softened and then solidifying the filament (the printing material).

A filament serving as a raw material of the structure is obtained by linearly forming a thermoplastic resin such as, for example, a polylactic acid (PLA) resin, an acrylonitrile-butadiene-styrene (ABS) resin, a nylon resin, a polyethylene terephthalate (PET) resin, and an acrylic resin. A thermoplastic resin other than the above can also be applied as the filament. The filament has, for example, a diameter of about 2 mm. For example, the filament is withdrawn in an accommodation state in which it is wound around a predetermined reel (a bobbin). The size of the filament is not limited to the above. The diameter of the filament can be about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10 mm. Also, the diameter of the filament may be less than 0.5 mm and 10 mm or more. The filament is a continuous material that continuously extends along a central axis. In an example, the entire filament has the same cross-sectional shape over an axial direction. In another example, the filament can have a partially different cross-sectional shape. As will be described below, the filament can have another shape such as a band shape or a film shape. As will be described below, the cross-sectional shape of the filament is not limited to a circle (or an ellipse), and various shapes can be applied. An accommodation state of the filament is not limited to a winding type.

Figure 1:
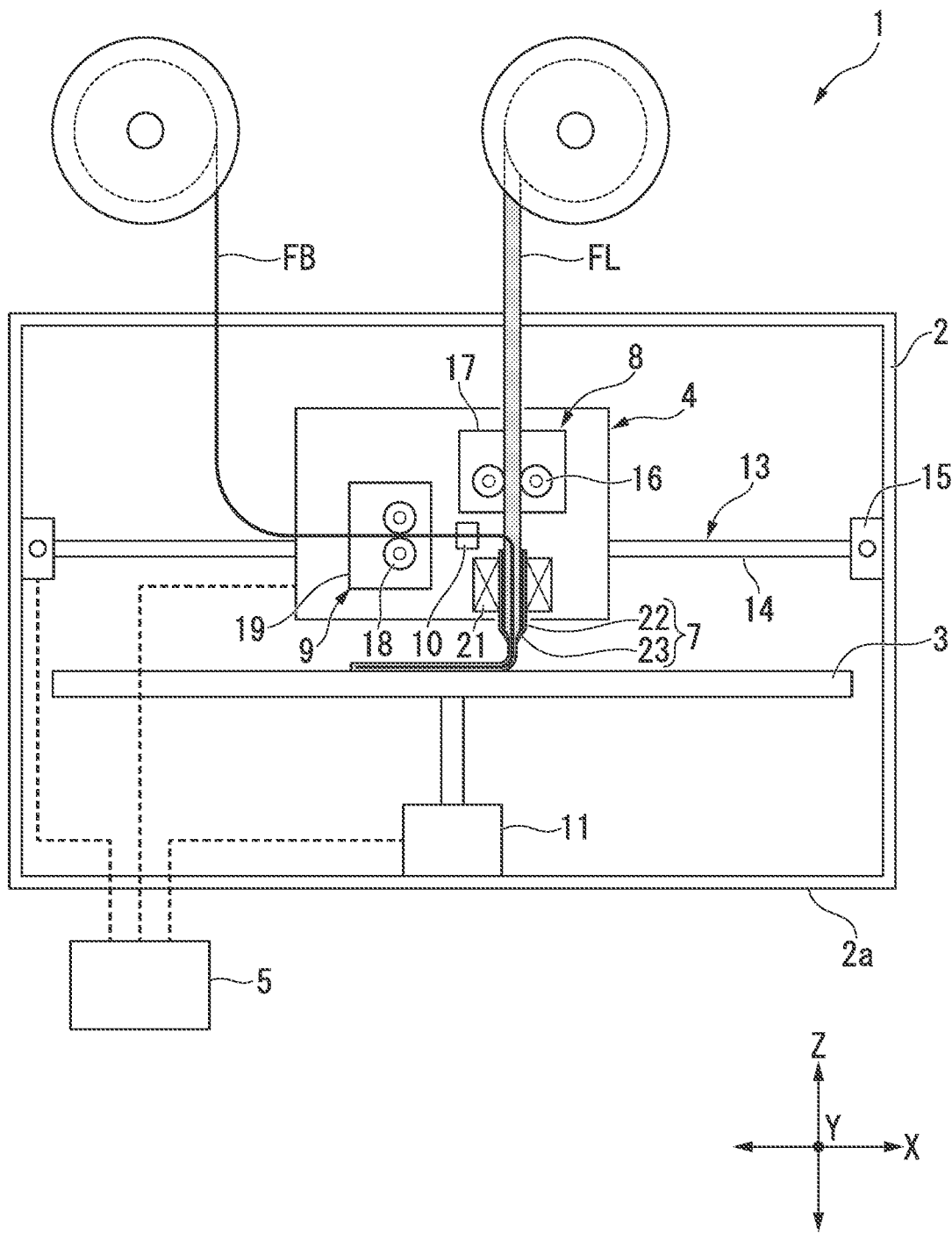
FIG. 1 is a schematic constitution diagram of a molding device (a three-dimensional printing system) of an embodiment.

In one embodiment, as shown in FIG. 1, a molding device 1 has a casing 2, a platform (a support member or a pad) 3 which is disposed inside the casing 2, a head (a printer head) 4 which supplies the platform 3 with a filament FL, and a control device (a controller) 5 as main constitution elements. In FIG. 1, an arrow Z indicates a vertical direction (upward and downward), an arrow X indicates one direction in a horizontal direction, and an arrow Y indicates a direction that is a horizontal direction and is perpendicular to the Z direction and the X direction.

The head 4 has a nozzle 7, a material feed device (a resin pushing device, a material feeder, or a first feeder) 8 configured to feed the filament (a resin material, a base material, or a first continuous material including a resin) FL to the nozzle 7, and a fiber introducing device (a fiber guide unit, a fiber feeder, or a second feeder) 9 configured to supply the filament FL with carbon fiber(s) (a carbon fiber bundle, fiber(s), a functional material, or a second continuous material including fiber(s)) FB which is continuously formed. In one embodiment, the molding device 1 further has a cutting device (a cutting unit or a cutter) 10 configured to cut the carbon fiber(s) FB and a filament heating device (a resin softening unit, a heater, or a first heating unit) 21 configured to heat the filament FL. In an example, at least a portion of the filament heating device 21 is provided in the nozzle 7. In an example, the material feed device 8 is configured to feed the filament FL while pushing the filament FL through the nozzle 7.

The casing 2 is a box-shaped casing. In an example, a working window (an opening) is provided in a front surface of the casing 2. The platform 3, the head 4, and the like are accommodated inside the casing 2. The casing 2 can include an environmental control unit (not shown) configured to control an indoor environment as necessary.

In one embodiment, the platform 3 has a rectangular shape plate (a base plate) which is parallel to a bottom surface 2a of the casing 2. The platform 3 is disposed under the head 4 and near a bottom portion of the casing 2. In an example, the platform 3 is driven to be capable of being vertically moved by a platform driving device 11 in a Z axis direction (a vertical direction). In an example, a platform heating device (not shown) configured to heat the disposed filament FL is provided at the platform 3. In other words, the platform 3 has a function of heating the filament FL disposed on the platform 3. As a device of heating the platform, various functions which can control the temperature of a resin on the platform can be applied in addition to a plate heater, a surface heater, or the like.

In one embodiment, the head 4 includes a mechanism serving as an injection device (an extrusion device) configured to dispose the filament FL at any position on the platform 3. In the head 4, the filament FL and the carbon fibers FB are fed. The head 4 is configured to be capable of being moved by a head driving device 13 in at least two dimensions along a plane which is parallel to the platform 3. The platform 3 is freely movable upward and downward so that a distance (and a relative positional relationship) between the nozzle 7 of the head 4 and the platform 3 can be freely adjusted.

The head driving device 13 drives the head 4 such that the head 4 can be moved to any position on a surface which is parallel to the platform 3. In one embodiment, since the platform 3 has a support surface that is perpendicular to the Z axis direction (the vertical direction), the head driving device 13 moves the head 4 in the horizontal direction.

The head driving device 13 has an X axis driving device 14 configured to move the head 4 in a first direction along the surface which is parallel to the platform 3 and a Y axis driving device 15 configured to move the head 4 in a second direction which is perpendicular to the first direction along the surface which is parallel to the platform 3. In an example, the X axis driving device 14 and the Y axis driving device 15 can have a constitution in which linear motion mechanisms such as a stepping motor and ball screws are combined.

Various types of device can be applied as the head driving device 13. For example, the head driving device 13 can have a robotic arm. In an example, the head 4 can be moved using the robotic arm along the surface that is parallel to the platform 3. In another example, the head 4 can be configured to be capable of being moved in three dimensions or to be capable of being moved with 6 degrees of freedom (X, Y, Z, θX, θY, and θZ). The head 4 can be configured such that an attitude thereof at least partially associated with an inclination and a rotational angle thereof can be adjusted in addition to a relative positional relationship between the head 4 and the platform 3 in an X axis direction, a Y axis direction, and the Z axis direction.

The head 4 is configured such that the filamentous filament FL is heated by the filament heating device 21 to a temperature near a melting point of the filament and then the softened filament FL is injected using the nozzle 7 in a predetermined thickness.

Various shapes of nozzle can be applied for the nozzle 7. In one embodiment, the nozzle 7 has a cylindrical-shaped cylindrical part 22 and a distal end portion 23 which is provided at one end of the cylindrical part 22. An opening (a nozzle opening or an outlet opening) used to inject the filament FL is provided at the distal end portion 23. The nozzle opening is set in accordance with a target thickness of the filament FL to be injected. For example, the nozzle opening can be changed by replacing the nozzle 7 with another nozzle. The size (a nozzle diameter) of the nozzle opening is, for example, 0.9 mm. The size (the nozzle diameter) of the nozzle opening can be about 0.1, 0.2, 0.3, 0.4, 0.5, 0.6, 0.7, 0.8, 0.9, 1, 2, 3, 4, 5, 6, 7, 8, 9, or 10 mm. The size (the nozzle diameter) of the nozzle opening may be less than 0.1 mm and 10 mm or more. Additionally and/or alternatively, a plurality of nozzles 7 can be provided in one head 4. The number of inlets (inlet ports) and the number of outlets (outlet ports) in the head 4 may be the same or different.

Various types of device can be applied for the filament heating device 21. In an example, at least a portion of the filament heating device 21 is fixed to an outer circumferential surface of the cylindrical part 22. An example of a method of heating the filament heating device 21 includes hot plate heating (a surface heater, a plate heater, or an aluminum foil heater), high frequency heating, induction heating, ultrasonic heating, laser heating, and the like.

The material feed device 8 is configured to feed the filament FL. In an example, the material feed device 8 is configured to push the filament FL through the inlet ports of the nozzle 7. In an example, the material feed device 8 has a pair of filament driving rollers (gears) 16 and a motor 17 configured to drive at least one of the filament driving rollers 16. One of the driving rollers 16 may be substituted with a pusher pin (not shown) or a pusher pin may be auxiliarily provided. In an example, a stepping motor is applied as the motor 17. In another example, a variety of other motors such as a servomotor that can drive the filament driving rollers 16 at any speed can be applied as the motor 17. Additionally and/or alternatively, the material feed device 8 can be configured to feed a plurality of filaments (a plurality of first continuous materials) FL to one head 4.

In an example, the filament driving rollers 16 can have tire-shaped rollers and filament holding grooves, which extend in a circumferential direction, formed in outer circumferential surfaces of the rollers. Gaps for the purpose of the filament FL are formed by the pair of filament holding grooves of the pair of filament driving rollers 16.

The filament driving rollers 16 are disposed such that the filament FL that is disposed inside the gaps is surrounded by the pair of rollers 16. The rotational speed of the filament driving rollers 16 is controlled in accordance with, for example, the amount of supply of the filament FL which is supplied from the nozzle 7 of the head 4.

The fiber introducing device 9 is configured to feed the carbon fibers FB. In an example, the carbon fibers FB are guided to inlets of the nozzle 7 via the fiber introducing device 9. The fiber introducing device 9 can have the same fiber pushing structure as that of a filament pushing structure of the material feed device 8. In an example, the fiber introducing device 9 has a pair of fiber driving rollers (gears) 18 which serves as a feeder configured to feed fibers and a motor 19 configured to drive at least one of the pair of fiber driving rollers 18. The control device 5 is configured to individually control the material feed device 8 and the fiber introducing device 9. One of the driving rollers 18 may be substituted with a pusher pin or a pusher pin may be auxiliarily provided. In another example, when the carbon fibers FB are fed by a driving force of the material feed device 8, the motor 19 can be omitted. As a fiber element in the carbon fibers FB such as, for example, a polyacrylonitrile (PAN)-based carbon fiber serving as a carbon fiber using an acrylic fiber can be adopted. The type of fiber is not limited to the above. Additionally and/or alternatively, the fiber introducing device 9 can be configured to feed a plurality of fibers FB (a plurality of second continuous materials) to the one head 4. Additionally, the fiber introducing device 9 can have a comb member (not shown) which is disposed to adjust a flow of the fibers FB (or a fiber element CF). In an example, the comb member is disposed to mitigate or resolve twisting of the fiber(s) FB (or the fiber element CF) or is disposed to arrange or align the plurality of fibers FB (or the plurality of fiber elements CF).

In one embodiment, the fiber introducing device 9 is configured to introduce the carbon fibers FB at a position between the material feed device 8 and the filament heating device 21. In this case, the filament FL and the carbon fibers FB are coupled to the nozzle 7 at a rearward position (an upstream position). A position (a coupling position) into which the carbon fibers FB are introduced is not limited thereto. For example, the fiber introducing device 9 may be configured such that the carbon fibers FB are introduced at a position (a forward position (a downstream position) with respect to the nozzle 7) between the nozzle 7 and the platform 3.

Figure 2:
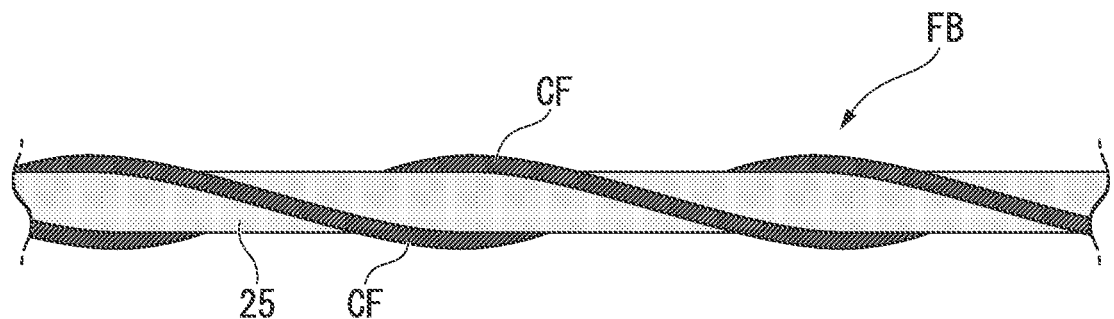
FIG. 2 is a schematic diagram of carbon fiber of the embodiment.

In an example, as shown in FIG. 2, the carbon fiber(s) (composite fiber(s)) FB has a plurality of fiber elements CF and a support member 25. The plurality of fiber elements CF are wound around a circumferential surface of the support member 25. The plurality of fiber elements CF are supported by the linear support member 25. In an example, a plurality of carbon fibers CF are fixed to an outer circumferential surface of the support member 25 by an adhesive or the like. An example of a material of the support member 25 includes a resin (including a synthetic resin or a fluorine resin), a metal, or a composite material and the like which are made of a plurality of elements. In an example, the support member 25 is formed of a plastic such as a polyacetal resin (POM). A material used to form the support member 25 is preferably a material with elasticity, and a wire or the like which is made of a metal can also be adopted. The support member 25 may be fed onto the platform 3 as a portion of a printing material PM. Alternatively, the support member 25 may be fed onto the platform 3 by separating the support member 25 from a printing material PM (the fiber elements CF).

Figure 3:
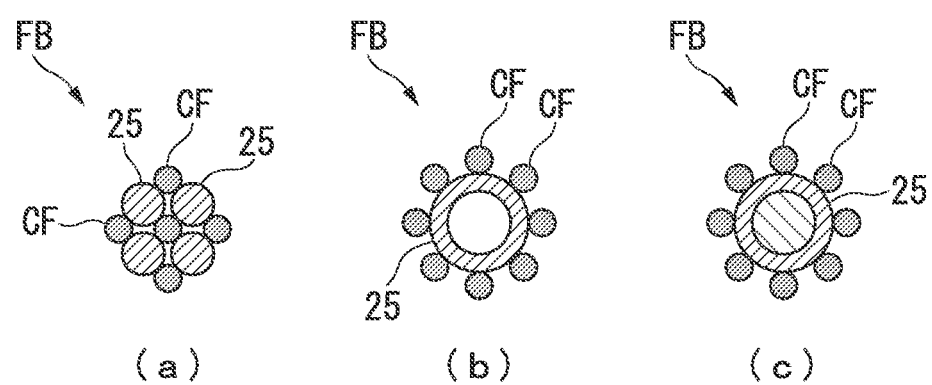
FIG. 3 is a schematic cross-sectional view showing another example of carbon fiber.

In another example, as shown in a cross-sectional view of (a) of FIG. 3, carbon fiber(s) FB can have a structure in which a plurality of fiber elements CF and a plurality of support members 25 are twisted together. Alternatively, as shown in a cross-sectional view of (b) of FIG. 3, carbon fiber(s) FB can have a structure that has a plurality of fiber elements CF and a hollow type of support member 25. Alternatively, as shown in a cross-sectional view of (c) of FIG. 3, carbon fiber(s) FB can have a structure that has a plurality of fiber elements CF and a multi-layered support member 25.

Figure 4:
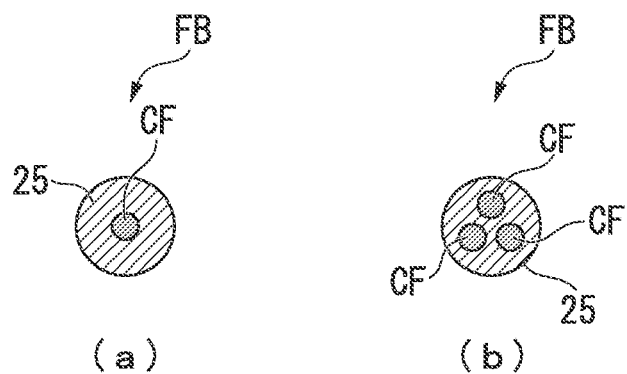
FIG. 4 is a schematic cross-sectional view showing another example of carbon fiber.

Also, in another example, as shown in a cross-sectional view of (a) of FIG. 4, carbon fiber(s) FB can have a structure in which a fiber element CF is accommodated inside a support member 25 or a structure in which the fiber elements CF are covered with the support member (a coating material) 25. Alternatively, as shown in a cross-sectional view of (b) of FIG. 4, carbon fiber(s) FB can have a structure in which a plurality of fiber elements CF are accommodated inside a support member 25 or a structure in which the plurality of fiber elements CF are covered with the support member (a coating material) 25.

Figure 5:
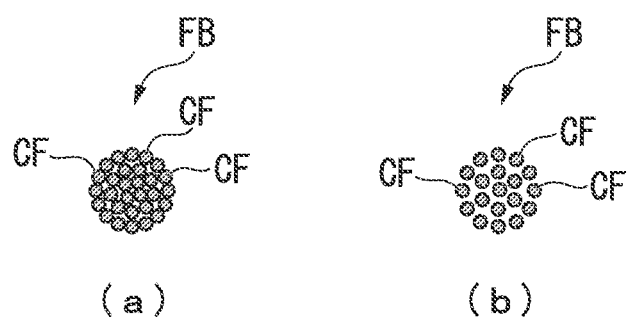
FIG. 5 is a schematic cross-sectional view showing another example of carbon fiber.

Also, in another example, as shown in cross-sectional views of (a) and (b) of FIG. 5, carbon fiber(s) FB can have structures in which support members are omitted. In (a) of FIG. 5, carbon fiber(s) FB has a relatively dense twisted structure of a plurality of fiber elements CF. In (b) of FIG. 5, carbon fiber(s) FB has a relatively sparse twisted structure of a plurality of fiber elements CF.

Figure 6A:
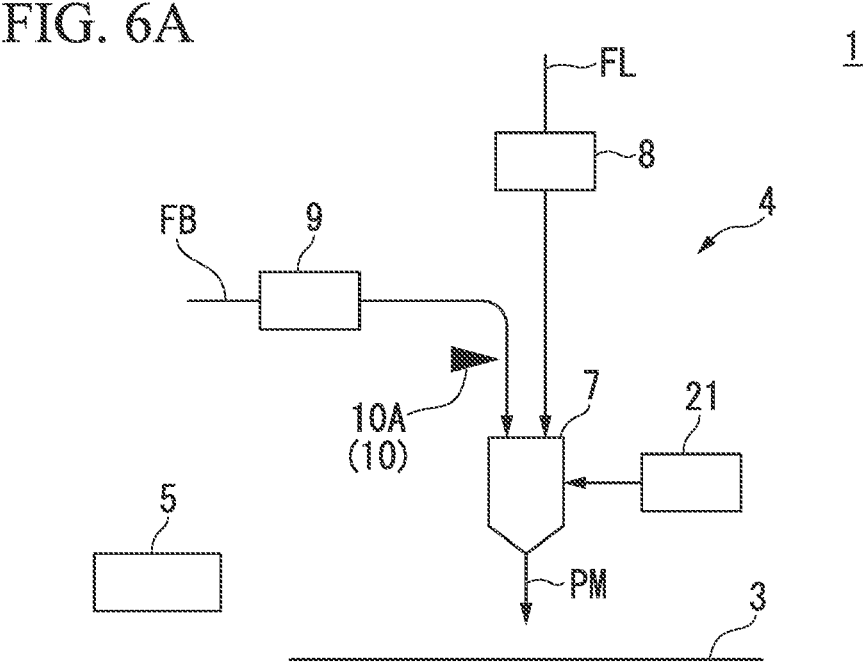
FIG. 6A is a schematic constitution diagram showing a modified example of a molding device.
Figure 6B:
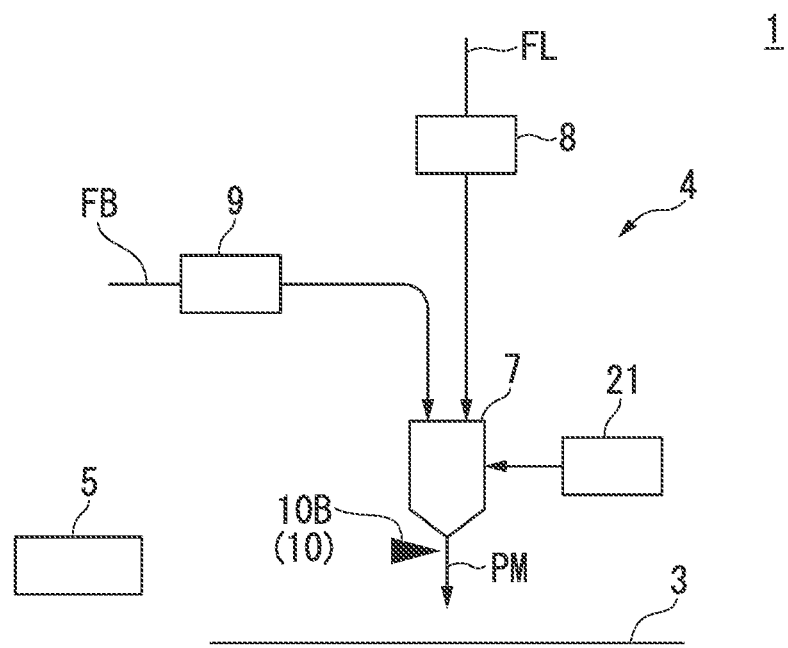
FIG. 6B is a schematic constitution diagram showing a modified example of the molding device.

In FIGS. 6A and 6B, a cutting device 10 has a cutting unit (a first cutter) 10A or a cutting unit (a second cutter) 10B which cuts carbon fiber(s) FB introduced through the fiber introducing device 9. In FIG. 6A, the cutting device 10 has the cutting unit 10A which is disposed at a downstream side of the fiber introducing device 9 and at an upstream side of the nozzle 7. The cutting unit 10A has a rearward cutting position (an upstream cutting position) which is disposed at a rear side (an upstream side) with respect to a coupling position (for example, the nozzle 7) configured to unite a filament FL and the carbon fibers FB. The cutting unit 10A is configured to cut the carbon fibers FB that are fed (for example, which is pushed) from the fiber introducing device 9. The cutting unit 10A can cut the carbon fibers FB at a time that is based on an instruction from the control device 5. In FIG. 6B, the cutting device 10 has the cutting unit 10B which is disposed at a downstream side of the nozzle 7. The cutting unit 10B has a forward cutting position (a downstream cutting position) that is disposed at a front side (a downstream side) with respect to a coupling position (for example, the nozzle 7) configured to unite the filament FL and the carbon fibers FB. The cutting unit 10B is configured to cut a printing material PM that is pushed out from the nozzle 7. The cutting unit 10B can cut a printing material PM that includes the carbon fibers FB or a printing material PM which does not include the carbon fibers FB at a time which is based on an instruction from the control device 5.

Figure 6C:
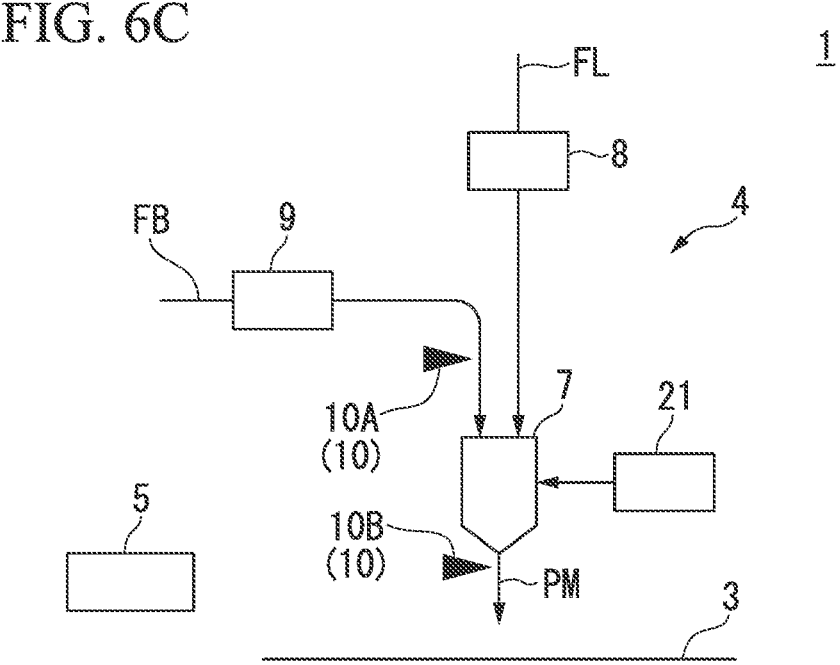
FIG. 6C is a schematic constitution diagram showing a modified example of the molding device.

In FIG. 6C, the cutting device 10 has both of the first cutting unit 10A with the rearward cutting position (the upstream cutting position) and of the second cutting unit 10B with the forward cutting position (the downstream cutting position). The first cutting unit 10A can cut carbon fiber(s) FB at a time that is based on an instruction from the control device 5. The second cutting unit 10B can cut a printing material PM that includes the carbon fibers FB or a printing material PM which does not include the carbon fibers FB at a time which is based on an instruction from the control device 5. The control device 5 selectively uses any of the first cutting unit 10A and the second cutting unit 10B when the carbon fibers FB are cut. Alternatively, the control device 5 substantially uses both of the first cutting unit 10A and the second cutting unit 10B at the same time when the carbon fibers FB are cut.

Various types of device that can cut carbon fiber(s) FB can be applied as the cutting device 10 (the cutting unit 10A or 10B). In an example, a laser cutting device using a laser such as an YAG laser can be applied as the cutting device 10 (the cutting unit 10A or 10B). In another example, a mechanical constitution (a cutter or a roller cutter) having a saw (an electric circular saw or the like) or a blade can be applied as the cutting device 10 (the cutting unit 10A or 10B). Also, in another example, an ultrasonic cutting machine can be applied as the cutting device 10 (the cutting unit 10A or 10B). In another example, gas cutting, arc cutting, plasma cutting, and the like can be applied for the cutting device 10 (the cutting unit 10A or 10B). In an example of the arc cutting, a voltage is applied to an electrode near carbon fibers FB, and an arc is generated between the electrode and the carbon fibers. The carbon fibers FB can be cut using thermal energy of the arc. In an example, a constitution in which a portion of thermal energy at a time of cutting is reused in a heating process such as heating of a filament FL can be applied. In cutting the carbon fibers FB (the printing material PM), a relative speed difference between the nozzle 7 and a platform 3 may be used as will be described below.

The control device 5 has a computer configured to generally control an operation device including elements such as a head 4 (a head driving device 13), the platform 3 (a platform driving device 11), and the cutting device 10. To be specific, the control device 5 has a control program configured to control the operation device including the head 4 or the like, a storage device configured to store 3D data and the like of a structure, and a processor (a processor, a processing circuitry, or a circuitry) configured to execute the control program.

Next, an operation of the molding device 1 will be described.

Figure 7:
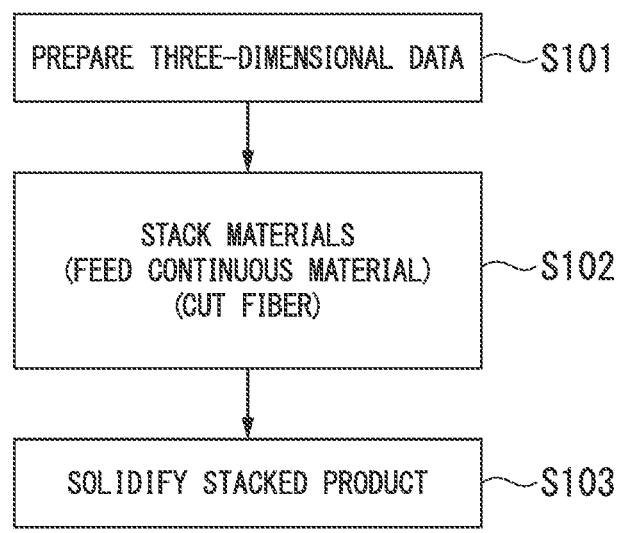
FIG. 7 is a flowchart showing an example of a three-dimensional printing method.

In one embodiment, when the molding device 1 is used, as shown in a flowchart of FIG. 7, a user prepares three-dimensional data of a structure (Step 101). The three-dimensional data can include various parameters (blending parameters) used to designate a blending state of a filament and carbon fibers which include a position, at which the carbon fibers are caused to be contained, and the like in addition to parameters used to designate a shape of the structure.

The user inputs shape data of the structure to a storage device of the control device 5. The shape data is three-dimensional data (three-dimensional model data), is sliced by a control program, and is converted into data obtained by stacking two-dimensional data. Also, a printing process in the two-dimensional data of layers is determined. The control program determines a travel path of the nozzle 7 on the basis of the determined two-dimensional data.

Subsequently, the control device 5 feeds a filament FL and the carbon fibers FB and stacks the materials onto the platform 3 (Step 102). In other words, the control device 5 controls the head driving device 13 such that the head 4 is moved along the determined travel path of the nozzle 7. Simultaneously, the material feed device 8 and the fiber introducing device 9 of the head 4 are controlled so that the filament FL is injected and the carbon fibers FB are impregnated into the filament FL. At this time, the filament FL can be softened by the filament heating device 21.

On the other hand, the fiber introducing device 9 is controlled such that it is synchronized with the material feed device 8, and the softened filament FL is impregnated into the carbon fibers FB introduced into the cylindrical part 22 of the nozzle 7. As a result, the filament FL (a softened printing material) containing the carbon fibers is injected from a distal end of the nozzle 7. The filament FL disposed on the platform 3 is heated by the platform heating device (not shown), and the softened state of the filament FL is maintained.

Also, the control device 5 controls the cutting device 10 such that a part, in which carbon fiber is not required, is not supplied with carbon fiber FB. To be specific, the carbon fibers FB introduced from the fiber introducing device 9 are cut on the basis of three-dimensional data in which a position, at which the carbon fibers are caused not to be contained, is designated, and the introducing of the carbon fibers FB stops. Thus, the formed structure contains a fiber portion CP in which the carbon fibers FB are introduced and a resin portion RP which is formed of only a resin. The stacked structure that is formed in a stacking process is solidified so that a three-dimensional structure (a fiber-containing object) is formed (Step 103).

According to the above-described embodiment, the carbon fibers FB are introduced into the filament FL to form the structure so that the strength of the structure can be improved. In other words, a material used to form the structure can be a resin obtained by reinforcing it using carbon fiber.

Also, the cutting device 10 cuts the carbon fibers FB so that, for example, a portion that does not include carbon fiber can be provided in the supplied filament FL. In other words, the amount of carbon fiber that is included in the structure is adjusted so that an amount of included carbon fiber(s) per unit volume can be changed. As described above, the content of carbon fiber(s) is changed so that characteristics such as elasticity can be changed depending on the formed part of the structure.

A constitution in which the carbon fiber(s) FB is introduced to the filament FL is set so that a combination of resin and fiber can be freely selected. In other words, a material constituting the filament FL or a material constituting fiber(s) can be arbitrarily selected.

The carbon fiber(s) FB has a structure in which carbon fiber(s) CF is held by the support member 25 so that the carbon fiber can be stably introduced to the filament FL in a state in which the carbon fiber CF is not divided.

The head 4 (the nozzle 7) is prevented from being clogged by the filament FL using binding of the filament FL and the fibers.

In one embodiment, the control device 5 controls various control elements included in the operation device so that a structure (a stacked product, a three-dimensional object, or a fiber-containing object) with a first portion and a second portion that include different blending states of the fibers with respect to the resin can be formed. An example of the blending states includes an amount of fibers included in the resin per unit volume, a continuous length of the fibers, a direction of the fibers, a structure of the fibers, an impregnation rate of the resin with respect to the fibers, a void fraction, and the like.

An example of the control elements (a parameter, a control parameter, and an operational parameter) includes a cutting condition (a cutting position, on/off of cutting, a cutting condition (an output and the like) and the like) of the cutting device 10 (the cutting unit 10A or 10B), a driving condition (a feed rate (an amount of supply of a filament) and the like) of the material feed device 8, a driving condition (a feed rate (an amount of supply of fiber) and the like) of the fiber introducing device 9, a relative condition (a relative speed, a relative moving direction, a relative attitude (an inclination and a rotational angle), and a relative moving distance) between the head 4 (the nozzle 7) and the platform 3, a heating condition (a heating position, a heating distance, an output (a temperature), a time, the number of times, a heating method, and the like) of the filament heating device 21, and the like.

The cutting unit 10A is used in a cutting process so that only the carbon fibers FB can be cut while a portion on the platform 3 is supplied with the filament FL during the stacking process. Only the filament FL is supplied so that a part that does not include carbon fiber FB is formed. The above-described stacking process can be used, for example, for the purpose of reducing a weight of an object.

On the other hand, the cutting unit 10B is used in the cutting process so that the entire printing material PM (the carbon fibers FB and the filament FL) can be cut during the stacking process (a printing process or a drawing process). At this time, the material feed device 8 and the fiber introducing device 9 are controlled so that feeding of the filament FL and the carbon fibers FB stops or a speed of the feeding is reduced. When the printing material PM is cut, supply of the printing material PM onto the platform 3 substantially pauses. Also, after the head 4 and/or the platform 3 are/is moved, the stacking process can be resumed. As a result, continuous processes (continuous drawings) in the stacking process can start and end at any position. In other words, the printing pattern (the drawing pattern) is not limited to a one-stroke drawing, and diversification of the printing pattern is achieved.

Here, the ratio of the amount of supply of the fibers to the resin is controlled so that a content rate (a fiber content rate) of the fibers with respect to the resin can be controlled. In an example, a feed rate of the carbon fibers FB is changed while a feed rate of the filament FL is kept constant so that the fiber content rate is changed. Alternatively, the moving speed (a relative speed between the head 4 and the platform 3) of the nozzle 7 is changed while the feed rate of the filament FL is kept constant so that the fiber content rate is changed. In an example, the moving speed (the relative speed between the head 4 and the platform 3) of the nozzle 7 can be automatically controlled such that it coincides with the feed rate of the carbon fibers FB.

In an example of the stacking process, when the amount of supply of fiber is 0 (zero), a fiber content at a corresponding stacked place is 0 (zero). When the feed rate of the filament FL is the same as the feed rate of the carbon fibers FB, the fiber content at the corresponding stacked place is maximized. When a processing speed is increased, for example, the feed rate of the filament FL and the feed rate of the carbon fibers FB may be increased in the same proportion.

As described above, in the above-described embodiment, there are many control elements, and a choice of the stacking process is wide. Thus, fiber-containing objects with various structures can be formed.

A constitution in which a three-dimensional printing system 1 (the control device 5) has a learning function can be adopted instead of the three-dimensional data which is prepared in advance. In an example, the filament FL and the fibers FB are fed by an operation of an operator, and the printing material PM is stacked on the platform 3. In an operation of the stacking process, the operator can input at least a portion of control elements (a parameter, a control parameter, and an operational parameter) in the system 1. The control device 5 stores control elements in the stacking process. When a new object is created, the system 1 can use the stored control elements. As described above, the learning function is used so that a three-dimensional object that is substantially the same as a sample created by an operation of the operator can be automatically formed.

Alternatively, the operator can select a sample model for each layer at the time of the stacking process. In the sample models, a specification such as the fiber content or the array direction of fiber(s) is determined. The operator can select the sample model and input another parameter (a shape, a size, or the like). The system 1 executes a printing process on the basis of parameters based on the sample model and parameters input by the operator. The above-described printing process is repeatedly executed for each layer so that a three-dimensional object can be formed without preparing three-dimensional data in advance. In addition, a three-dimensional object can be formed using various methods other than the above without preparing three-dimensional data in advance.

Next, a structure (a fiber-containing object) that is formed by the molding device 1 of an embodiment will be described.

Figure 8:
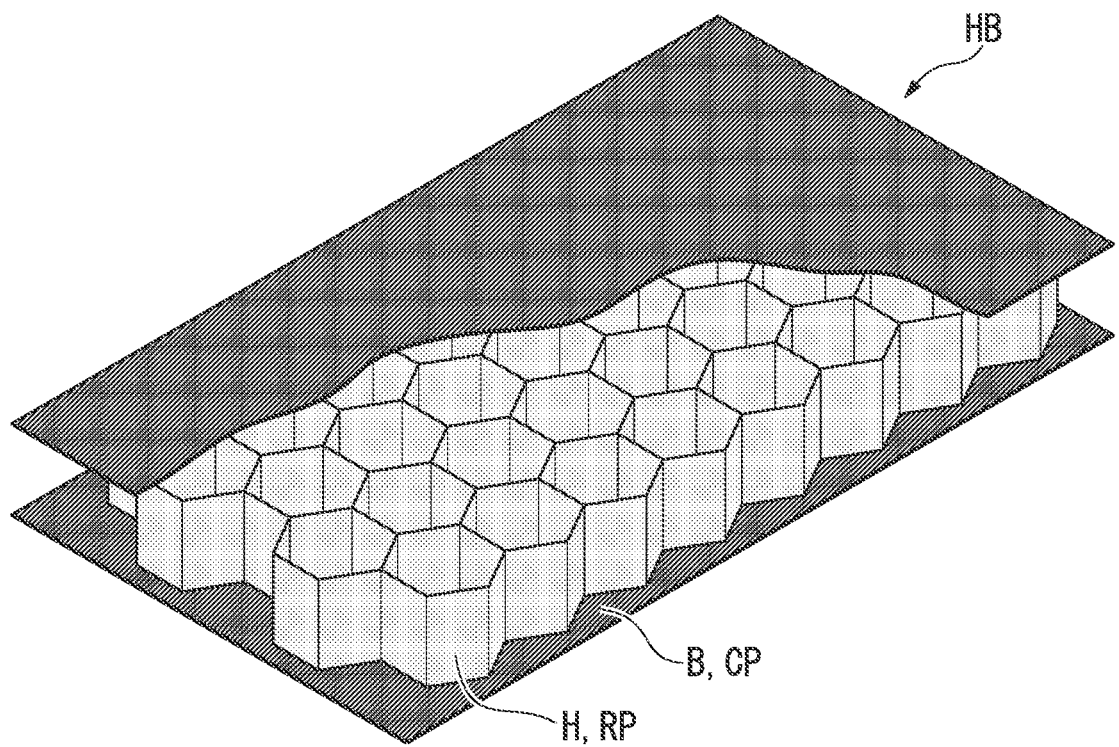
FIG. 8 is an example of a structure that is formed by a molding device.

FIG. 8 is an example of a structure that is formed by the molding device 1 and is a honeycomb board HB obtained by sandwiching a core material of a honeycomb structure using plate-shaped members. The honeycomb board HB is integrally formed using the molding device 1. In other words, a structure in which a plate-shaped part B and a part with a honeycomb structure H are coupled as separate bodies is not provided, but a structure with an excellent strength is provided.

Also, a portion of the honeycomb board HB is formed of carbon fiber reinforced thermoplastics (CFRTPs). To be specific, only the plate-shaped part B is formed of CFRTP. In other words, carbon fiber(s) is contained in a resin that constitutes the plate-shaped part B of the honeycomb board HB as a reinforcement. The head 4 of the molding device 1 supplies the filament FL and the carbon fibers FB in a process of forming the plate-shaped part B to form the honeycomb board HB with such a structure, and, the carbon fibers FB are cut and introducing of the carbon fibers FB stops supplying only the filament FL in a process of forming the part with the honeycomb structure H. Thus, the plate-shaped part B of the honeycomb board HB is formed by the fiber portion CP, and the part with the honeycomb structure H is formed by the resin portion RP.

Figure 9:
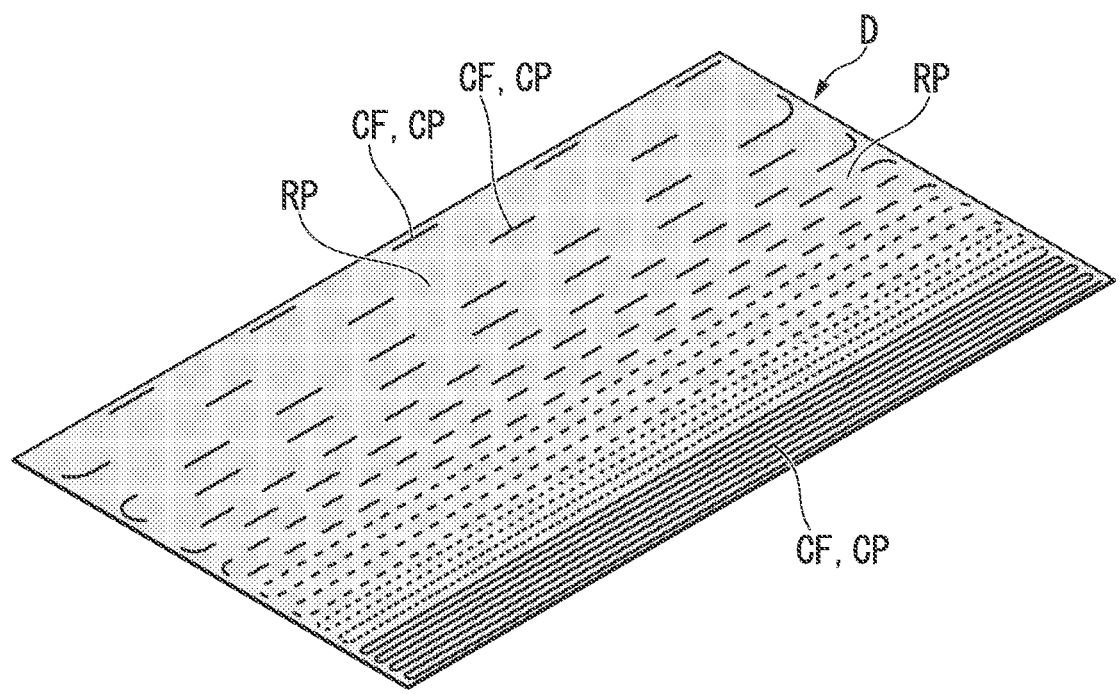
FIG. 9 is an example of a structure that is formed by the molding device.

The above-described structure has a constitution in which the carbon fibers are introduced and the fiber portion CP is formed at any part and carbon fiber is not introduced and the resin portion RP is formed at another part, but the present invention is not limited thereto. For example, as shown in FIG. 9, a proportion of the carbon fiber(s) CF may be gradually changed in a plate-shaped member D. Thus, the plate-shaped member D in which the ratio of the resin portion RP with respect to the fiber portion CP is gradually changed can be formed. In other words, a structure of which the strength gradually changes can be formed.

As another example, a carbon fiber can also be locally disposed to strengthen a thread of a screw hole (a female screw) (or a thread of a male screw).

Figure 10:
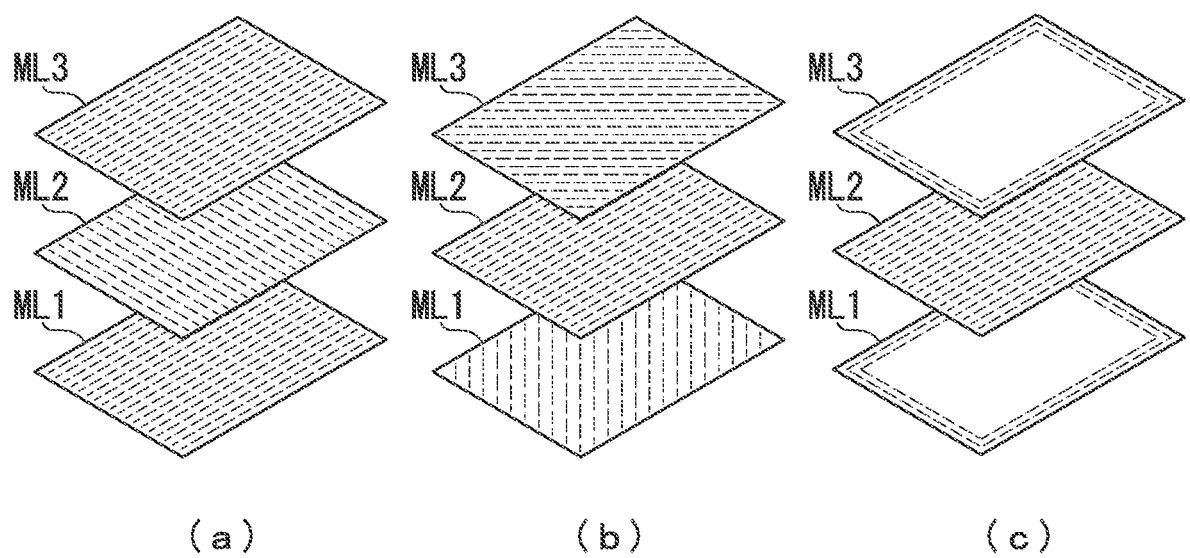
FIG. 10 is a schematic diagram showing an example of a stacking process.

As shown in FIG. 10, in the stacking process, array states of fibers in two layers that overlap each other can be different from each other. In an example shown in (a) of FIG. 10, in the stacking process, a first layer ML1 and a second layer ML2, having an extending direction of fiber(s) of which is 90° different from that of the first layer ML1, overlap each other such that the second layer ML2 is above the first layer ML1. Also, the second layer ML2 and a third layer ML3, having an extending direction of fiber(s) of which is 90° different from that of that of the second layer ML2, overlap each other such that the third layer ML3 is above the second layer ML2. An interlayer shift angle can be arbitrarily set. In an example shown in (b) of FIG. 10, in the stacking process, the first layer ML1 and the second layer ML2, having an extending direction of the fiber(s) of which is 45° different from that of the first layer ML1, overlap each other such that the second layer ML2 is above the first layer ML1. The second layer ML2 and the third layer ML3, having an extending direction of the fiber(s) of which is 45° different from that of the second layer ML2, overlap each other such that the third layer ML3 is above the second layer ML2. In an example of (c) of FIG. 10, in the stacking process, the first layer ML1 the fiber(s) of which is disposed in a frame shape and the second layer ML2 the fiber(s) of which is disposed under a uniform condition with respect to the entire one surface overlap each other such that the second layer ML2 is above the first layer ML1. The second layer ML2 and the third layer ML3 the fiber(s) of which is disposed in a frame shape overlap each other such that the third layer ML3 is above the second layer ML2.

Figure 11:
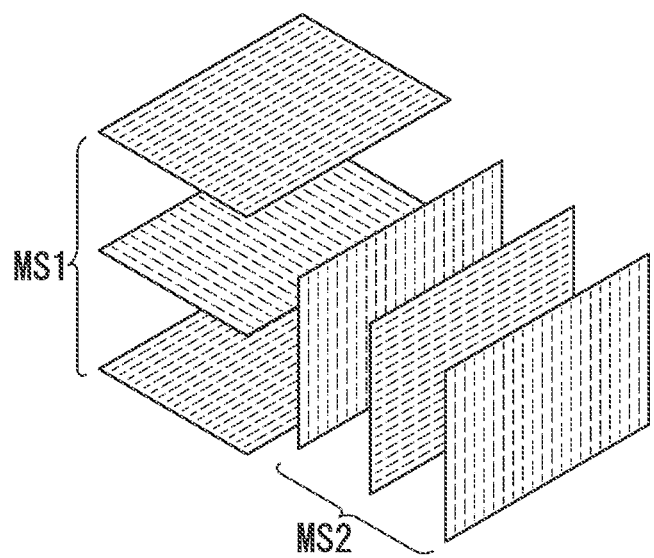
FIG. 11 is a schematic diagram showing an example of the stacking process.

As shown in FIG. 11, in the stacking process, a plurality of stacked structures having attitudes which are different from each other can be combined. In FIG. 11, a second stacked structure MS2 is formed with respect to a first stacked structure MS1 in a stacking direction which is 90° different from a stacking direction of the first stacked structure MS1. A shift angle (the amount of attitude shift) between the structures can be arbitrarily set.

Figure 12:
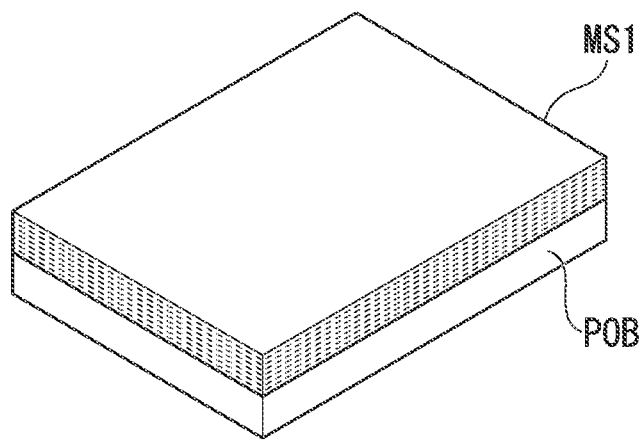
FIG. 12 is an example of a structure that is formed by a molding device.

As shown in FIG. 12, a fiber-containing stacked structure can be formed with respect to an object that is prepared in advance. In FIG. 12, a fiber-containing stacked structure MS1 is formed on a surface of a plate-shaped object POB made of a predetermined material such as a resin.

Figure 13:
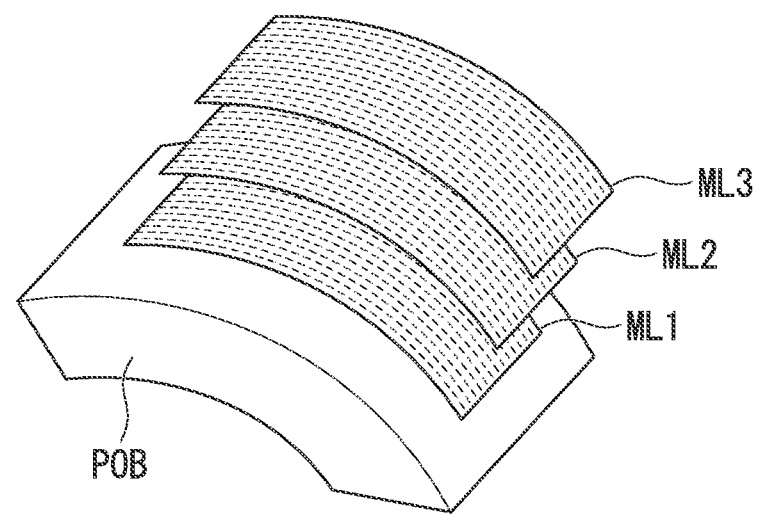
FIG. 13 is an example of a structure that is formed by the molding device.

As shown in FIG. 13, a parameter is appropriately controlled so that a layer with a curved surface can also be stacked. In FIG. 13, for example, a plurality of layers ML1, ML2, and ML3 with the same curvature as a curvature of a surface of the object POB which is prepared in advance and the object POB subsequently overlap each other such that the plurality of layers ML1, ML2, and ML3 are above the surface of the object POB.

Figure 14:
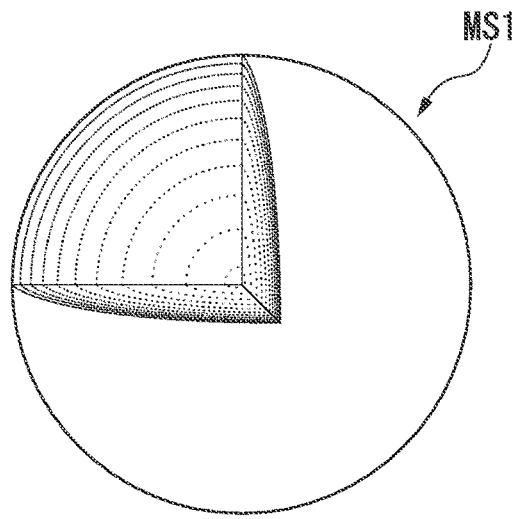
FIG. 14 is an example of a structure that is formed by the molding device.

As shown in FIG. 14, an object with a partially different fiber density can be created. In FIG. 14, a parameter is appropriately controlled so that an object with a stacked-layer structure MS1 a center of which has a relative low fiber density and a portion near an outer surface of which has a relative high fiber density is created.

Figure 15:
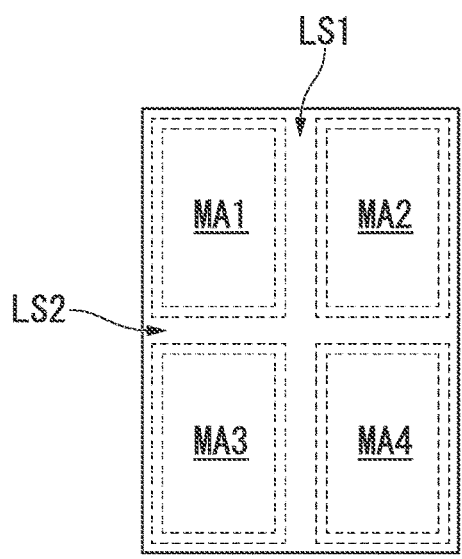
FIG. 15 is an example of a structure that is formed by the molding device.

As shown in FIG. 15, an object with a partially low strength portion can be created. In FIG. 15, a plurality of regions MA1, MA2, MA3, and MA4 that are surrounded by fiber(s) disposed in a frame shape are provided, and low strength portions LS1 and LS2 are provided at a portion between the regions.

Figure 16:
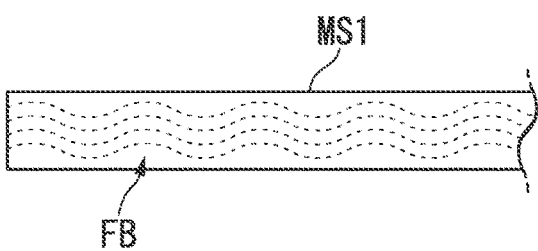
FIG. 16 is an example of a structure that is formed by the molding device.

As shown in FIG. 16, an object with elasticity directivity can be created. In FIG. 16, an array structure of fiber(s) FB in a plate-shaped stacked body MS1 is appropriately controlled so that a plate-shaped object that is relatively easily curved around a predetermined axis is created.

Next, a modified example of the above-described embodiment will be described.

Figure 17:
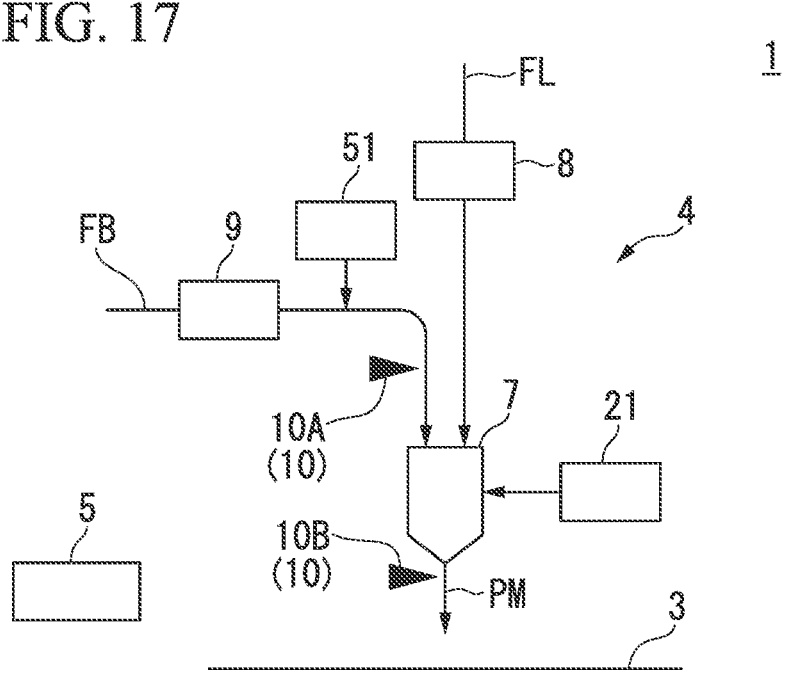
FIG. 17 is a schematic constitution diagram showing a modified example of a molding device.

In the modified example, as shown in FIG. 17, a molding device 1 is provided separately from a filament heating device 21 and can have a fiber heating unit (a preheater or a second heating unit) 51 configured to mainly heat carbon fiber(s) FB.

Various types of unit can be applied as the fiber heating unit 51. An example of a heating method includes hot wire heating, high frequency heating, induction heating, ultrasonic heating, laser heating, and the like. In an example, carbon fibers FB can be heated using a heating wire (a nichrome wire or the like) in the fiber heating unit 51. Alternatively, a part that is in contact with the carbon fibers FB is set as an electrode, and the carbon fibers FB are electrified and heated via the part. For example, the rollers 18 (refer to FIG. 1) of the fiber introducing device 9 and other rollers (not shown) may be set as a pair of electrodes, and a current can be applied to the carbon fibers FB via these rollers. Alternatively, the carbon fibers FB are irradiated with a laser beam from a laser unit. The carbon fiber FB can be heated using thermal energy of the laser beam. The laser unit controls an output so that the laser unit can be used as the cutting unit 10A of the carbon fibers FB. The fiber heating unit 51 can further include a heat-retaining device configured to keep the heated carbon fibers FB warm.

Referring again to FIG. 6A, a shape of an opening (an outlet opening) of the nozzle 7 can be a circle, an ellipse, a rectangular shape, a polygon, or any shape. In an example, a rectangular nozzle opening is used so that a void fraction in the stacked structure can be reduced. In this case, for example, a printing pitch (an array pitch or a shift distance) is set to the same extent as a nozzle opening width.

A shape of an internal passage of the nozzle 7 may have the same diameter as a whole in an axial direction and have a diameter that changes in the axial direction. An appropriate diameter change of the internal passage helps improvement of insertability of the filament FL and the carbon fibers FB or improvement of the fiber content. In an example, the number of fiber elements in the carbon fiber(s) FB is reduced so that an impregnation rate of the resin of the filament FL with respect to the fibers FB can be improved. Alternatively, the size of an opening (an outlet opening) of the nozzle 7 is reduced so that the impregnation rate thereof can be improved.

A slit-shaped nozzle opening is configured such that a band-shaped (sheet-shaped) printing material PM can be disposed on the platform 3. A void fraction in the stacked structure can be reduced by the stacking process using the band-shaped printing material PM. In this case, the stacking process can be performed such that, for example, one continuous band and another continuous band partially overlap each other for the purpose of minimizing an inter-layer gap.

A cross-sectional shape of the filament FL can be a circle, an ellipse, a rectangular shape, a polygon, or any shape. In an example, a thin-band-shaped filament FL can be used. For example, the filament FL and the carbon fibers FB are inserted into the nozzle 7 and are coupled to each other while the band-shaped filament FL is wound around carbon fiber(s) FB. Thus, the carbon fiber(s) FB is covered with the filament FL, and the impregnation rate of the resin with respect to fiber is improved.

When the filament FL is coupled to the carbon fibers FB, the carbon fibers FB can be pressed to the filament FL using heating rollers. In this case, the filament FL preferably has a shape that is appropriate for a pressing process of a band shape or the like. The impregnation rate of the resin with respect to fiber is improved by the bonding using the pressing process.

When the carbon fibers FB are fed, appropriate tension is preferably applied to the carbon fibers FB. In an example, a difference can be given between a driving force at a relative forward position (a downstream position) and a driving force at a relative rearward position (an upstream position). Alternatively, an appropriate brake is applied to the carbon fibers FB at the relative rearward position (the upstream position). The carbon fibers FB are fed to have appropriate tension so that the carbon fibers FB are prevented from being twisted. The carbon fibers FB are also brought into contact with circumferential surfaces of guide rollers so that twisting of the carbon fibers FB is prevented.

In the above-described embodiment, it is configured that the platform 3 is freely vertically movable and the head 4 is freely horizontally movable such that the filament FL and the carbon fibers FB can be disposed in three dimensions. In another example, it can be configured that the head 4 is freely vertically movable and freely horizontally movable, for example, a robotic arm and the platform 3 may be fixed such that the filament FL and the carbon fibers FB can be disposed in three dimensions. Various constitutions can be applied as a unit in which a relative position and an attitude (an inclination, a rotational angle, and the like) can be freely controlled.

In the above-described embodiment, carbon fiber(s) is adopted as a fiber in which a filament FL is impregnated, but the present invention is not limited thereto as long as the carbon fiber is a fiber that serves as a reinforcing material. For example, a glass fiber or a resin fiber can also be adopted. The fiber can include a first fiber and a second fiber that have different materials. The fiber can include the first fiber and the second fiber that have the same material, but different shapes and/or structures or twisting conditions. The fiber can include fiber elements of three or more types.

It may be configured that a plurality of fiber introducing devices 9 are provided and a plurality of carbon fibers (carbon fiber bundles) FB are introduced into the filament FL. In this case, it may be configured that carbon fiber(s) FB is introduced from one fiber introducing device 9 and glass fiber(s) is introduced from the other fiber introducing device 9. With such a constitution, for example, carbon fiber(s) can be introduced into a part in which rigidity is required, and glass fiber(s) can be introduced into a part in which ductility is required.

Figure 18:
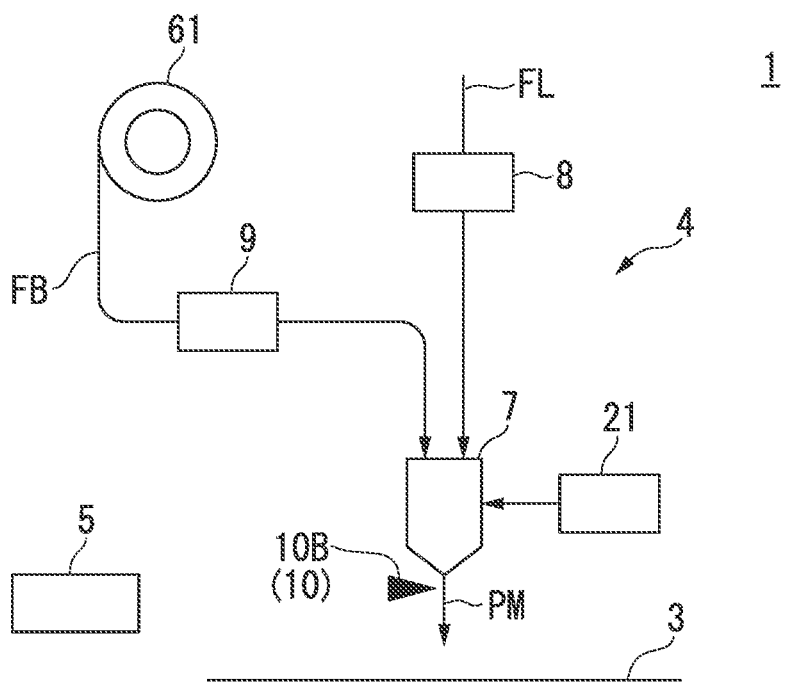
FIG. 18 is a schematic constitution diagram showing a modified example of the molding device.

As shown in FIG. 18, even if rotation (a driving force or a breaking force) of a predetermined reel (a bobbin) 61 in which carbon fibers FB are accommodated is controlled, the tension of the carbon fibers FB can be controlled. In other words, when the filament FL and the carbon fibers FB are coupled to a portion inside or near the nozzle 7, a holding force acts on the carbon fibers FB at a portion inside or near the nozzle 7. In this state, for example, the reel 61 is fixed not to rotate or a breaking force of the reel 61 is appropriately controlled so that the tension of the carbon fibers FB is maintained. In this case, even after the cutting unit 10B cuts the printing material PM, a distal end position of the carbon fibers FB can be maintained. When the filament FL is fed again, previous fixing control of the reel 61 is cancelled. As a result, the carbon fibers FB are also fed along with the feeding of the filament FL. As will be described below, when the fixing control is not cancelled, the carbon fibers FB are prevented from being fed, and a portion on the platform 3 is supplied with only the filament FL. Alternatively, strong tension acts on the carbon fibers FB and thus the fibers FB are cut.

In an example, when a coupled state of the fibers FB and the filament FL is relatively weak, an angular velocity (a rate at which the fibers FB are fed along with the rotation of the reel 61) of the reel 61 is set to slightly smaller than the feed rate of the filament FL so that a state in which predetermined tension is continuously provided to the fibers FB can be maintained. The carbon fibers FB are fed to have an appropriate tension so that the carbon fibers FB are prevented from being twisted.

In an example, if the coupled state of the fibers FB and the filament FL is relatively strong, in a normal mode, a moving speed (a relative speed between the head 4 and the platform 3) of the nozzle 7 can be controlled to coincide with the feed rate of the carbon fibers FB. On the other hand, when the feed rate of the fibers FB is slower than the moving speed of the nozzle 7, strong tension is provided to the fibers FB along with a fiber supply shortage and thus the fibers FB are cut.

Figure 19:
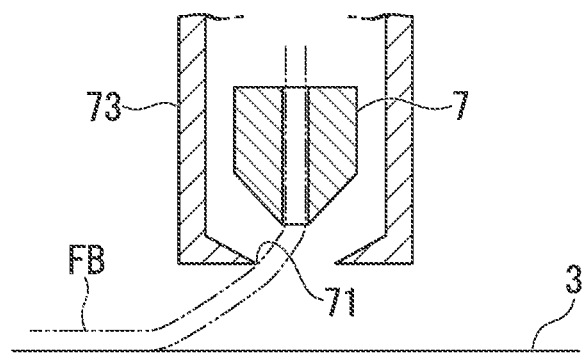
FIG. 19 is a schematic cross-sectional view showing another example of a cutting device.

In this case, as shown in FIG. 19, a blade 71 is disposed near the distal end of the nozzle 7 so that the cutting of the fibers FB is promoted. In an example, the blade 71 is provided at one end of a cylindrical body 73 that is disposed to cover the nozzle 7. The blade 71 includes a corner (a blade part) having an acute angle over a circumferential direction thereof. In this form, the cutting by the blade 71 is promoted so that tension at the cutting is set to be relatively low, and thus a defect of the fibers FB along with strong tension at the cutting is prevented from being generated. Also, in this form, there are a small number of constituent parts, and a constitution of the cutting device is simplified.

Referring again to FIG. 18, if the coupled state of the fibers FB and the filament FL is relatively weak, the rotation (the driving force or the breaking force) of the reel 61 in which the carbon fibers FB are accommodated is controlled so that the content (the fiber content) of the fibers with respect to the resin can be adjusted. In an example of the stacking process, when the angular velocity (the rate at which the fibers FB are fed along with the rotation of the reel 61) of the reel 61 is 0 (zero), the coupled state of the fibers FB and the filament FL is released, and the portion on the platform 3 is supplied with only the filament FL from the nozzle 7. As a result, the fiber content at a corresponding stacked place is 0 (zero). When the angular velocity of the reel is the same as the feed rate of the filament FL, the fiber content at the corresponding stacked place is maximized.

At least a portion of the fiber-containing object manufactured in the above-described embodiment can be made of a fiber-reinforced plastic. An example of the fiber-reinforced plastic includes a carbon-fiber-reinforced plastic (CFRP), carbon-fiber-reinforced thermoplastics (CFRTPs), a fiber-reinforced plastic (FRP; a glass fiber-reinforced plastic (GFRP)), an aramid fiber-reinforced plastic (AFRP), a boron fiber-reinforced plastic (BFRP), and the like.

The fiber is not limited to a function as a reinforcing material. An example of a function which is added/controlled by the fiber includes a physical function (rigidity, a weight, flexibility, toughness, extensibility, elasticity, a bending strength, partial reinforcement (a strength due to a density and a constitution structure), wear resistance, and the like), an electrical function (chargeability, conductivity, and the like), an optical function (transparency, gloss, a color, an ultraviolet cut, reflection, text, a pattern, appearance characteristics, and the like), and a chemical function (flame retardance, an antibiotic action, acid resistance, alkali resistance, chemical resistance, substance absorbability, metal adsorbability, weatherability, heat characteristics, a heat retaining property, a cool keeping property, and the like).

In the above-described embodiment, a thermoplastic resin is used as a resin serving as a base material constituting the filament FL, but another resin a softened state and a cured state of which can be artificially controlled can also be adopted. For example, a softened resin may be cured by an action of light energy by adopting a photo-curable resin. The resin serving as the base material can include a first resin and a second resin that have different materials. The resin serving as the base material can include the first resin and the second resin that have the same material, but different shapes and/or structures or twisting conditions. The resin serving as the base material can include resin elements of three or more types.

In the above-described embodiment, the filament FL serving as the first continuous material and the carbon fiber(s) FB serving as the second continuous material are individually fed to the head 4, and the filament FL and the carbon fiber(s) FB are coupled to the portion inside or near the nozzle 7. In another embodiment, a constitution in which a coupling position is coupled to a rear side (an upstream side) of the head 4 can be applied. Alternatively, a constitution in which a continuous material, in which the filament FL and the carbon fiber(s) FB are united in advance, is fed to the head 4 can be applied.

Figure 20:
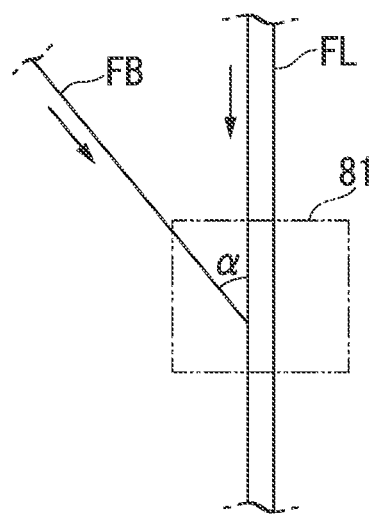
FIG. 20 is a schematic diagram showing an example of a guide part of fiber.
Figure 20:
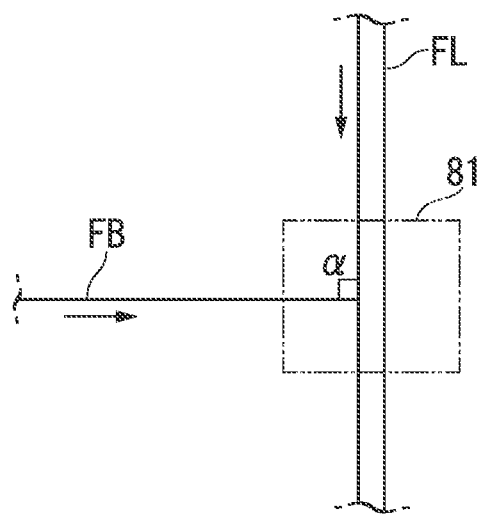
Figure 20:
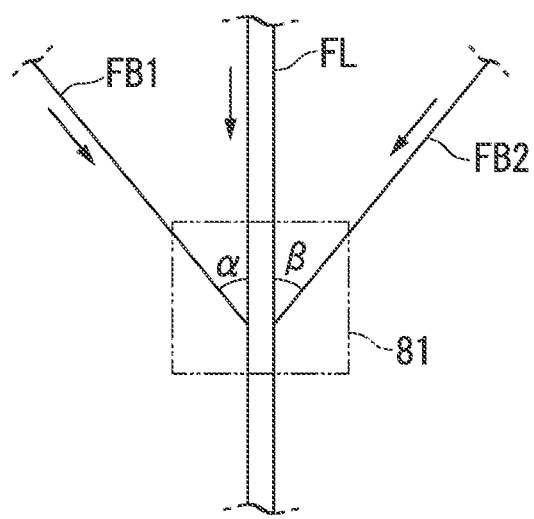
Figure 20:
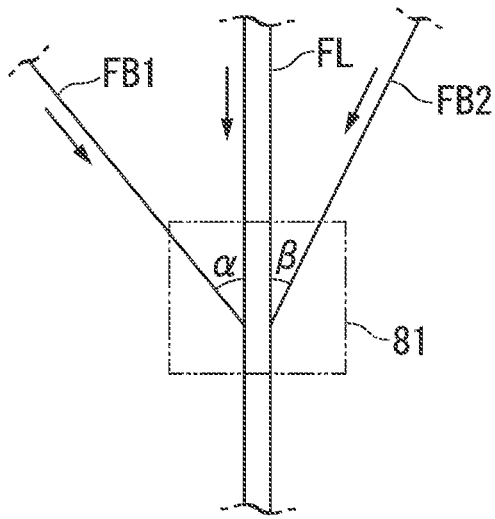

As shown in FIG. 20, the system 1 can further have a guide part (a conductor, a fiber conductor, an interlacer, an entangler, an engager, or an enlace member) 81 configured to guide the fiber(s) FB such that the fiber(s) FB (the second continuous material) is fed to the filament FL (the first continuous material) in a state in which the fiber(s) FB crosses the filament FL. In an example, one continuous filament FL is supplied with one continuous fiber or a plurality of continuous fibers. Crossing angles α and β of fibers FB (first fiber(s) FB1 and second fiber(s) FB2) with respect to the filament FL can be about 5, 10, 15, 20, 25, 30, 35, 40, 45, 50, 55, 60, 65, 70, 75, 80, 85, or 90°, or more. As shown in (c) of FIG. 20, the crossing angle α of the first fiber(s) FB1 with respect to the filament FL can be substantially the same as the crossing angle β of the second fiber(s) FB2 to the filament FL. As shown in (d) of FIG. 20, the crossing angle α of the first fiber(s) FB1 with respect to the filament FL can be different from the crossing angle β of the second fiber(s) FB2 to the filament FL. The feeding of the fiber(s) FB in the crossing state is advantageous to stabilization of engagement of the fiber(s) FB with the filament FL or holding of the fiber(s) FB by the filament FL.

In an embodiment, the guide part 81 can be configured such that the filament FL is interlaced with fiber(s) FB. Alternatively, the guide part 81 can be configured such that the filament FL is sewn on or is knitted out of the fiber(s) FB. Alternatively, the guide part 81 can be configured such that the engagement of the fiber(s) FB with the filament FL is promoted.

Figure 21:
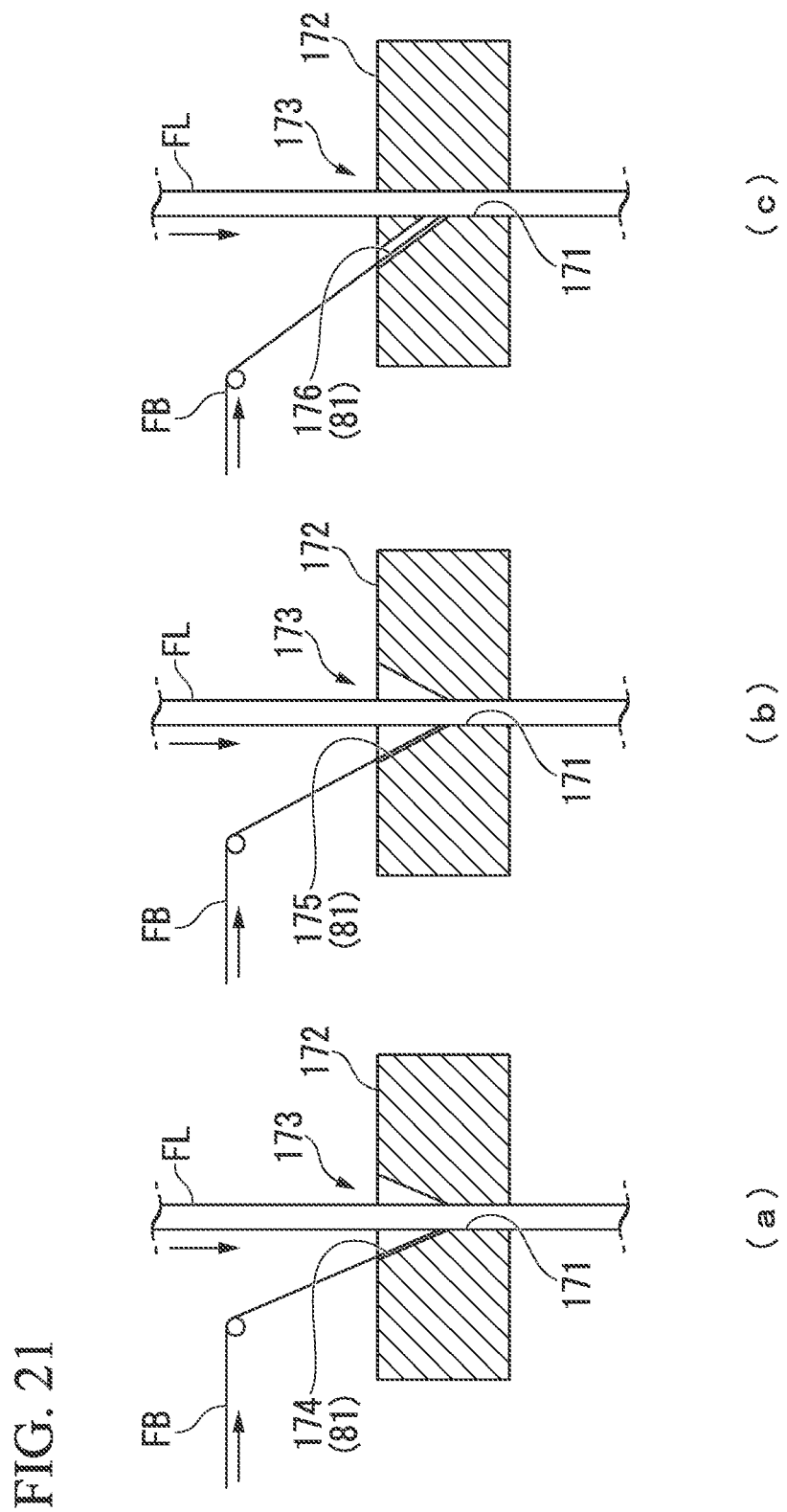
FIG. 21 is a schematic diagram showing an example of a guide part of fiber.

In (a) of FIG. 21, the guide part 81 has an inclined surface (an inclined circumferential surface or a curved surface (an inclined curved surface)) 174 that is provided in an inlet port 173 of a member 172 including a hole 171 through which the filament FL passes. In an example, the fiber(s) FB is guided along the inclined surface 174. The fiber(s) FB is fed to the filament FL in a state in which the fiber(s) FB along the inclined surface 174 crosses the filament FL. In (b) of FIG. 21, the guide part 81 has a groove 175 that is provided near the inlet ports 173 of the nozzle member 172. In an example, the fiber(s) FB is guided along a bottom surface of the groove 175. In (c) of FIG. 21, the guide part 81 has a hole 176 that is provided near the inlet ports 173 of the nozzle member 172. In an example, the fiber(s) FB is guided along the hole 176.

Figure 22:
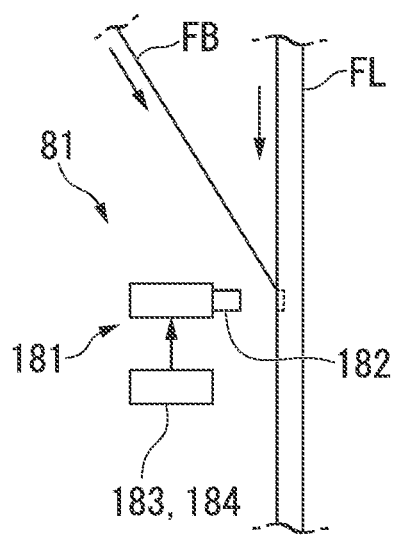
FIG. 22 is a schematic diagram showing an example of a guide part of fiber.
Figure 22:
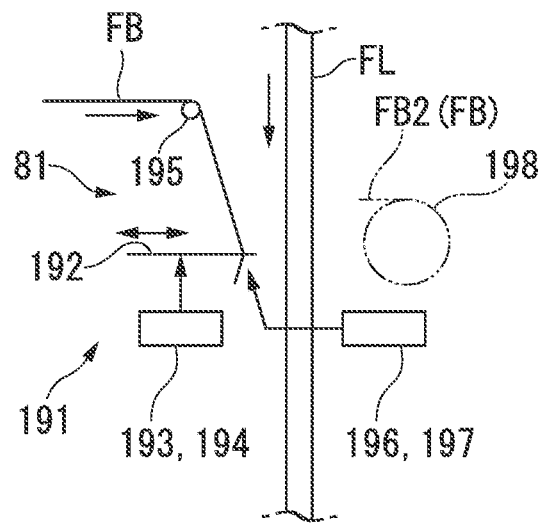

In (a) of FIG. 22, the guide part 81 has a tacker 181 configured to retain (tack) a portion of the fiber(s) FB with respect to the filament FL. In an example, the tacker 181 has a tack pin (or a tack blade) 182 and a driver 183 configured to drive the tack pin 182. The tacker 181 can have a heater 184 configured to heat at least a portion of the tack pin 182 as necessary. The portion of the fiber(s) FB is embedded in the filament FL so that the portion of the fiber(s) FB is retained in the filament FL. Through such a tack process, the engagement of the fiber(s) FB with the filament FL is prompted. Additionally, a resin piece can also be placed on the portion of the fiber(s) FB on a surface of the filament FL. The resin piece is pressed by the tack pin 182 so that the engagement of the fiber(s) FB with the filament FL is further prompted. The filament FL (and/or the resin piece) is temporarily softened/melted by the heater 184 so that the engagement of the fiber(s) FB with the filament FL is further prompted. Additionally and/or alternatively, the engagement of the fiber(s) FB with the filament FL can be promoted using an adhesive.

In (b) of FIG. 22, the guide part 81 has an interlacer (an interlacer, an entangler, an engager, or an enlace member) 191 configured such that the fiber(s) FB is interlaced with the filament FL. In an example, the interlacer 191 has a needle 192 used to provide a hook hole and/or a hook groove in the filament FL and a driver 193 configured to drive the needle 192. The interlacer 191 can have a heater 194 configured to heat at least a portion of the needle 192 as necessary. The interlacer 191 can have at least one of a guide member 195 configured to guide the fiber(s) FB, a threader 196 which causes the fiber(s) FB to pass through the needle 192, and a holder 197 configured to hold the fiber(s) FB with respect to the needle 192. The interlacer 191 can have a hook (for example, a rotary hook) 198 configured to supply another fiber(s) FB2 (FB) which is combined with the fiber(s) FB1 (FB) supplied via the needle 192.

Figure 23:
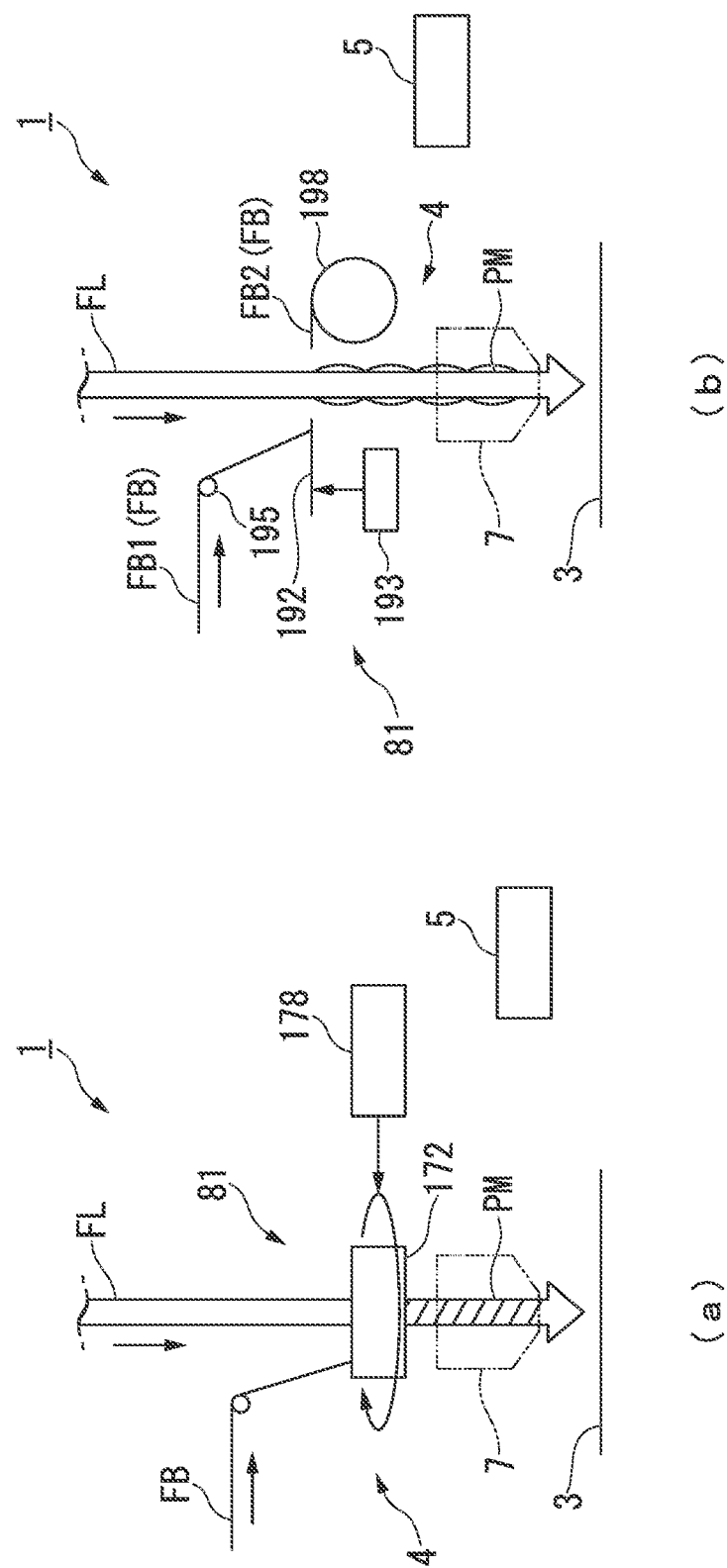
FIG. 23 is a schematic diagram showing a modified example of a molding device.

In an example of (a) of FIG. 23, at least a portion (the member 172) of the guide part 81 can be rotated around an axis of the filament FL while the filament FL is fed in the axial direction. With such relative movement (a change in relative positional relationship), a crossing state of the fiber(s) FB and the filament FL via the guide part 81 is changed. In this example, the fiber(s) FB is wound around the filament FL with the change in crossing state. The control device 5 controls the operation device including a driver 178 for the member 172 such that the printing material PM is fed toward the platform 3 from the head 4 in a state in which the crossing state thereof via the guide part 81 is changed. The coupling of the filament FL and the fiber(s) FB and the supply of the printing material PM including the fiber(s) FB are performed at the same time. The fiber(s) FB is fed to the nozzle 7 while being wound around the filament FL. The printing material PM including the fiber(s) FB is fed onto the platform 3 from the nozzle 7. A relative moving rate is adjusted with respect to the feed rate of the filament FL so that the feed rate of the fiber(s) FB with respect to the feed rate of the filament FL is changed. As a result, the content (the fiber content of the printing material PM) of fiber(s) with respect to the resin can be changed.

In an example of (b) of FIG. 23, a position (at least a position of the filament FL in a direction which is perpendicular to the axial direction) of at least a portion (the needle 192) of the guide part 81 with respect to the filament FL can be changed while the filament FL is fed in the axial direction. With such relative movement (a change in relative positional relationship), the crossing state of the fiber(s) FB and the filament FL via the guide part 81 is changed. In this example, the fiber(s) FB is woven into the filament FL with the change in crossing state. The control device 5 controls the operation device including the driver 193 for the needle 192 such that the printing material PM is fed toward the platform 3 from the head 4 in the state in which the crossing state thereof via the guide part 81 is changed. The coupling of the filament FL and the fiber(s) FB and the supply of the printing material PM including the (s) FB are performed at the same time. The fiber(s) FB is fed to the nozzle 7 while being woven from the filament FL. The printing material PM including the fiber(s) FB is fed onto the platform 3 from the nozzle 7. The relative moving rate is adjusted with respect to the feed rate of the filament FL so that the feed rate of the fiber(s) FB with respect to the feed rate of the filament FL is changed. As a result, the fiber content of the printing material PM can be changed.

Figure 24:
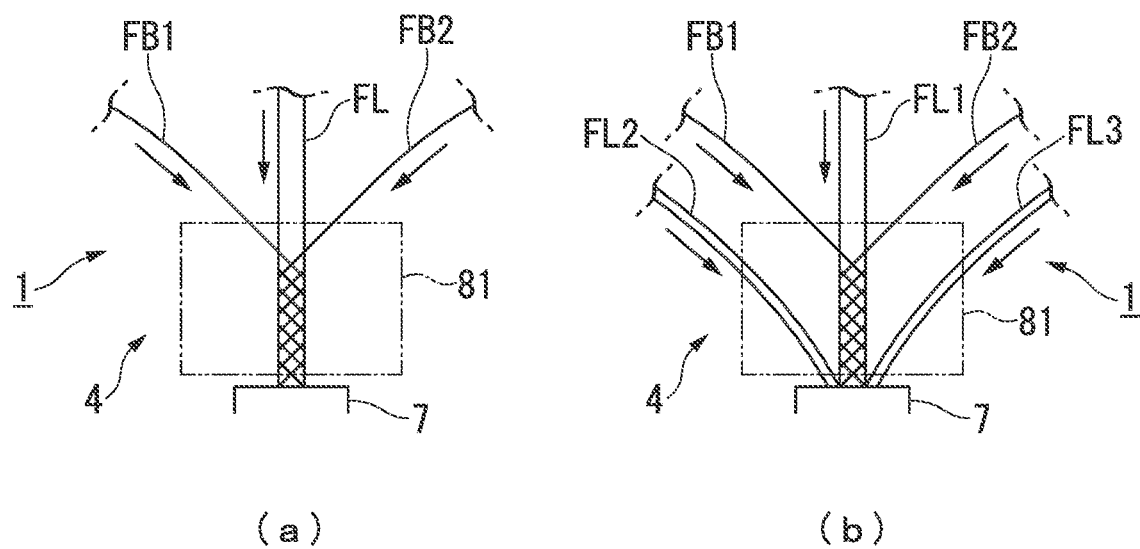
FIG. 24 is a schematic diagram showing a modified example of the molding device.

As shown in an example of (a) of FIG. 24, the system 1 can be configured such that a plurality of fibers (a plurality of second continuous materials) FB1 and FB2 are fed to one filament (a first continuous material) FL. As shown in (b) of FIG. 24, the system 1 can be configured such that a plurality of filaments (a plurality of first continuous materials) FL1, FL2, and FL3 are fed to one nozzle 7.

Figure 25:
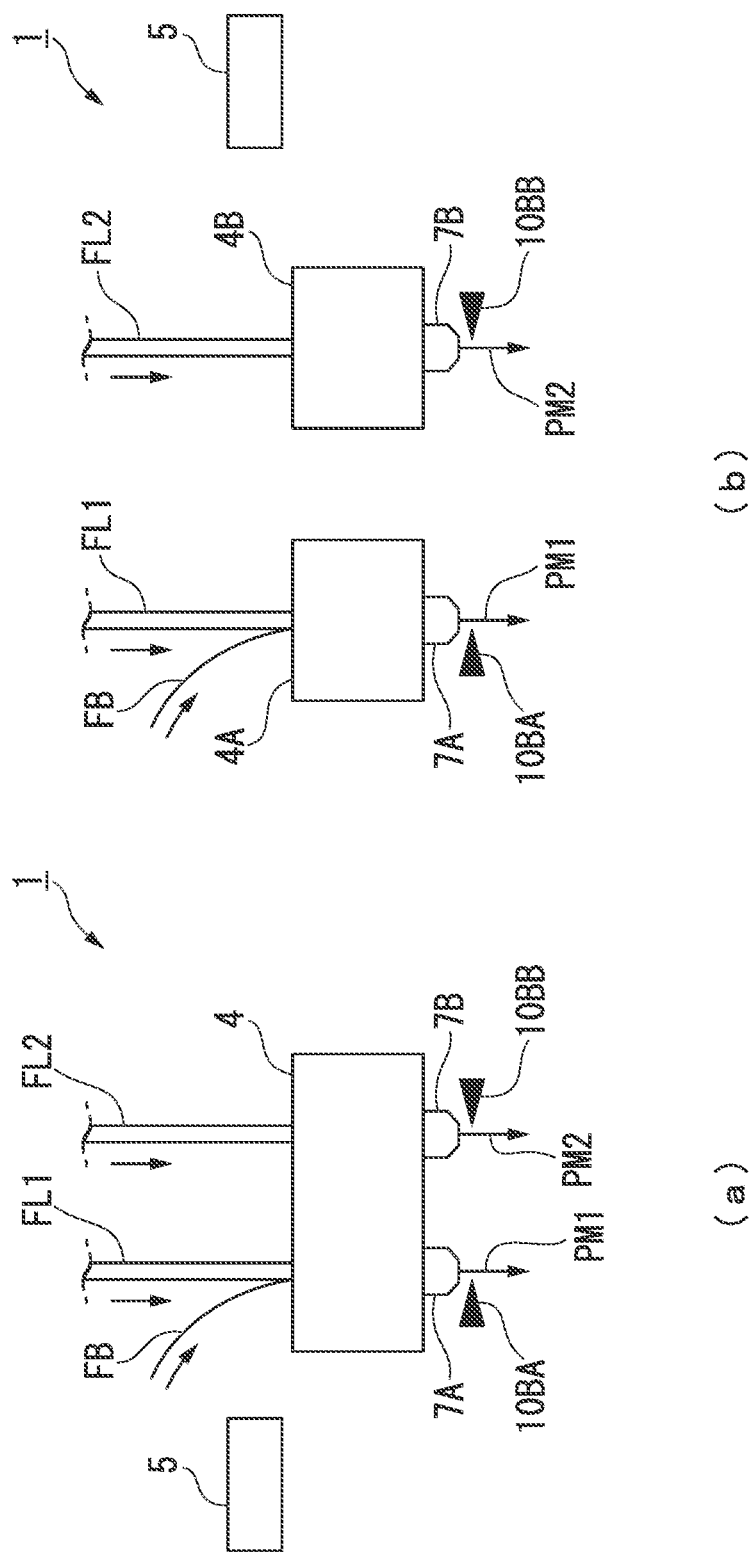
FIG. 25 is a schematic diagram showing a modified example of the molding device.

As shown in (a) of FIG. 25, the system 1 can have the head 4 with two nozzles 7A and 7B. In an example, a cutting unit 10BA with a forward cutting position (a downstream cutting position) is disposed near the nozzle 7A. A cutting unit 10BB with a forward cutting position (a downstream cutting position) is disposed near the nozzle 7B. In an example, the printing material PM1 that includes fiber(s) is fed through the nozzle 7A, and the printing material PM2 that does not include fiber is fed through the nozzle 7B. The cutting units 10BA and 10BB can individually cut the printing materials PM1 and PM2 at a time that is based on an instruction from the control device 5. Alternatively, the number of nozzles that are provided in one head can be three or more.

As shown in (b) of FIG. 25, the system 1 can include two heads 4A and 4B having the nozzles 7A and 7B. In an example, the cutting unit 10BA with the forward cutting position (the downstream cutting position) is disposed near the nozzle 7A. The cutting unit 10BB with the forward cutting position (the downstream cutting position) is disposed near the nozzle 7B. In an example, the printing material PM1 which includes fiber(s) is fed through the nozzle 7A, and the printing material PM2 that does not include fiber is fed through the nozzle 7B. The cutting units 10BA and 10BB can individually cut the printing materials PM1 and PM2 at a time that is based on an instruction from the control device 5. Alternatively, the number of heads that are provided in one system 1 can be three or more.

Content of various representative embodiments has been described above, but the embodiments are presented as examples and are not intended to limit the scope of the present invention. The embodiments can be carried out in various other forms, and various omissions, replacements, and changes are possible without departing from the gist of the present invention. The present invention includes all of modifications, alternatives, and equivalents that are included in the spirit and the scope of the present invention defined in the appended claims and the range equivalent thereto.

REFERENCE SIGNS LIST

1 Molding device (three-dimensional (3D) printer, a three-dimensional printing system)
2 Casing
3 Platform (support member)
4 Head (printer head)
5 Control device (controller)
7 Nozzle
8 Material feed device (resin pushing device)
9 Fiber introducing device
10 Cutting device (cutting unit)
11 Platform driving device
13 Head driving device
14 X axis driving device
15 Y axis driving device
16 Filament driving roller
17 Motor
18 Fiber driving roller (fiber feeding device)
19 Motor
21 Filament heating device
22 Cylindrical part
23 Distal end portion
25 Support member
B Plate-shaped part
H Honeycomb structure
FB Carbon fiber (fiber)
CF Carbon fiber
CP Fiber portion
FL Filament (linear resin)
RP Resin portion

The invention claimed is:

1. A three-dimensional printing system comprising:
a head that has a nozzle, and by which a first continuous material including a resin and a second continuous material including fibers are individually fed, the nozzle having a nozzle body, an inlet, an internal passage and an outlet, the inlet, the internal passage and the outlet being provided on the nozzle body such that the fibers are introduced into the internal passage via the inlet of the nozzle body;
a platform on which a printing material based on the first and second continuous materials from the outlet of the nozzle is stacked;
a cutting device that cuts at least the fibers; and
a controller that controls an operation device including at least one of the head, the platform, and the cutting device,
wherein the first continuous material includes a linear resin which extends continuously,
the three-dimensional printing system further comprises:
a heater that softens the linear resin such that the fibers are introduced into the linear resin at a coupling position between a feeder and the outlet of the nozzle; and
a preheater that heats the fibers with no resin addition,
wherein the heater is located between the inlet of the nozzle body and the outlet of the nozzle body in an axial direction of the nozzle,
the preheater is provided separately from the heater and separately from the nozzle body and is located at an upstream position with respect to the inlet of the nozzle body such that the fibers are heated prior to them being introduced into the internal passage via the inlet of the nozzle body.

2. The three-dimensional printing system according to claim 1, wherein the cutting device has at least one of a rearward cutting position and a forward cutting position which are respectively disposed at a rear side and at a front side with respect to a coupling position of the fibers and the linear resin.

3. The three-dimensional printing system according to claim 1, wherein
the feeder includes a first feeder for the first continuous material and a second feeder for the second continuous material, and
the controller individually controls the first feeder and the second feeder.

4. The three-dimensional printing system according to claim 1, wherein the feeder includes a guide part that guides the second continuous material such that the second continuous material is fed to the first continuous material in a state in which the second continuous material crosses the first continuous material, and the controller controls the operation device such that the printing material is fed toward the platform from the head in a state in which the second continuous material is wound around the first continuous material.

5. The three-dimensional printing system according to claim 1, wherein the controller controls the operation device such that a stacked product with a first portion and a second portion that include different blending states of the fibers is formed.

6. The three-dimensional printing system according to claim 5, wherein the blending states each include at least one of (a) an amount of fibers included in the resin per unit volume, (b) a continuous length of the fibers, (c) a direction of the fibers, (d) a structure of the fibers, (e) an impregnation rate of the resin with respect to the fibers, and (f) a void fraction.

7. A three-dimensional printing method comprising:
(a) providing a three-dimensional printing system, said system comprising:
a head that has a nozzle, and by which a first continuous material including a resin and a second continuous material including fibers are individually fed, the nozzle having a nozzle body, an inlet, an internal passage and an outlet, the inlet, the internal passage and the outlet being provided on the nozzle body such that the fibers are introduced into the internal passage via the inlet of the nozzle body, wherein the first continuous material includes a linear resin which extends continuously;
a platform on which a printing material based on the first and second continuous materials from the outlet of the nozzle is stacked;
a cutting device that cuts at least the fibers; and
a controller that controls an operation device including at least one of the head, the platform, and the cutting device;
a heater that softens the linear resin such that the fibers are introduced into the linear resin at a coupling position between a feeder and the outlet of the nozzle; and
a preheater that heats the fibers with no resin addition, wherein the heater is located between the inlet of the nozzle body and the outlet of the nozzle body in an axial direction of the nozzle, the preheater is provided separately from the heater and separately from the nozzle body and is located at an upstream position with respect to the inlet of the nozzle body such that the fibers are heated prior to them being introduced into the internal passage via the inlet of the nozzle body;
(b) preparing a three-dimensional model data; and
(c) stacking the printing material on the basis of the three-dimensional model data, in which the step (c) includes:
(c1) individually feeding the first continuous material including the resin and the second continuous material that includes the fibers to the head that has the nozzle;
(c2) softening the resin by the heater;
(c3) stacking the printing material based on the first and second continuous materials from the outlet of the nozzle on a platform; and
(c4) cutting at least the fibers; and
(d)
mainly heating the fibers by the preheater.

8. A production method of a fiber-containing object comprising:
providing a three-dimensional printing system, said system comprising:
a head that has a nozzle, and by which a first continuous material including a resin and a second continuous material including fibers are individually fed, the nozzle having a nozzle body, an inlet, an internal passage and an outlet, the inlet, the internal passage and the outlet being provided on the nozzle body such that the fibers are introduced into the internal passage via the inlet of the nozzle body, wherein the first continuous material includes a linear resin which extends continuously;
a platform on which a printing material based on the first and second continuous materials from the outlet of the nozzle is stacked;
a cutting device that cuts at least the fibers; and
a controller that controls an operation device including at least one of the head, the platform, and the cutting device;
a heater that softens the linear resin such that the fibers are introduced into the linear resin at a coupling position between a feeder and the outlet of the nozzle; and
a preheater that heats the fibers with no resin addition, wherein the heater is located between the inlet of the nozzle body and the outlet of the nozzle body in an axial direction of the nozzle, the preheater is provided separately from the heater and separately from the nozzle body and is located at an upstream position with respect to the inlet of the nozzle body such that the fibers are heated prior to them being introduced into the internal passage via the inlet of the nozzle body;
preparing a three-dimensional model data; and
forming a stacked product using the three-dimensional printing system on the basis of the three-dimensional model data.

9. A molding device which includes a support member, and in which a printing material is continuously disposed on the support member and then is solidified so that a structure is formed, the molding device comprising:
a resin pushing device that pushes a linear resin, which extends continuously, into a nozzle, the nozzle having a nozzle body, an inlet, an internal passage and an outlet, the inlet, the internal passage and the outlet being provided on the nozzle body such that the fibers are introduced into the internal passage via the inlet of the nozzle body;
a fiber introducing device that introduces continuous fibers into the linear resin;
a heating device that softens the linear resin such that the fibers are introduced into the linear resin at a coupling position between the resin pushing device and an outlet of the nozzle;
a preheater that heats the fibers with no resin addition,
wherein the heater is located between the inlet of the nozzle body and the outlet of the nozzle body in an axial direction of the nozzle, and
the preheater is provided separately from the heating device and separately from the nozzle body and is located at an upstream position with respect to the inlet of the nozzle body such that the fibers are heated prior to them being introduced into the internal passage via the inlet of the nozzle body; and
a cutting device that cuts the fibers.

10. The molding device according to claim 9, further comprising:
a guide part that guides the fibers to the linear resin at an angle at which the fibers cross the linear resin.

11. The molding device according to claim 9, wherein the fiber introducing device includes a fiber feeding device that feeds the fibers.

12. The molding device according to claim 9, further comprising:
a control device that controls the cutting device such that a fiber portion into which the fibers are introduced and a resin portion which is formed by only the resin are provided in the structure.

13. The three-dimensional printing system according to claim 1, wherein the head has a guide part that guides the second continuous material with respect to the first continuous material at an angle at which the second continuous material crosses the first continuous material.

14. The three-dimensional printing method according to claim 7, wherein the second continuous material has a structure in which the fibers are wound around a support member.

15. A three-dimensional printing method comprising:
(a) providing a head that has a nozzle, and by which a first continuous material including a resin and a second continuous material including fibers are individually fed, the nozzle having a nozzle body, an inlet, an internal passage and an outlet, the inlet, the internal passage and the outlet being provided on the nozzle body such that the fibers are introduced into the internal passage via the inlet of the nozzle body, wherein the first continuous material includes a linear resin which extends continuously;
(b) preparing a three-dimensional model data; and
(c) stacking a printing material on the basis of the three-dimensional model data, in which the step (c) includes:
(c1) individually feeding the first continuous material including the resin and the second continuous material including fibers to the head such that the fibers are introduced into the internal passage via the inlet of the nozzle body;
(c2) softening the resin by a heater;
(c3) stacking a printing material based on the first and second continuous materials from the outlet of the nozzle on a platform; and
(c4) cutting at least the fibers, and
heating the fibers by a preheater with no resin addition, the heater being located between the inlet of the nozzle body and the outlet of the nozzle body in an axial direction of the nozzle, the preheater is provided separately from the heater and separately from the nozzle body and is located at an upstream position with respect to the inlet of the nozzle body such that the fibers are heated prior to them being introduced into the internal passage via the inlet of the nozzle body.

16. The three-dimensional printing method according to claim 15, wherein the second continuous material has a structure in which the fibers are wound around a support member.

* * * * *